(12) United States Patent
Yoshino et al.

(10) Patent No.: US 8,504,602 B2
(45) Date of Patent: *Aug. 6, 2013

(54) MODULAR MULTIPLICATION PROCESSING APPARATUS

(75) Inventors: Masayuki Yoshino, Yokohama (JP);
Katsuyuki Okeya, Sagamihara (JP);
Camille Vuillaume, Kawasaki (JP)

(73) Assignee: Renesas Electronics Corporation, Kanagawa (JP)

( * ) Notice: Subject to any disclaimer, the term of this patent is extended or adjusted under 35 U.S.C. 154(b) by 254 days.

This patent is subject to a terminal disclaimer.

(21) Appl. No.: 13/041,604

(22) Filed: Mar. 7, 2011

(65) Prior Publication Data

US 2011/0161390 A1 Jun. 30, 2011

Related U.S. Application Data

(63) Continuation of application No. 11/586,542, filed on Oct. 26, 2006, now Pat. No. 7,904,498.

(30) Foreign Application Priority Data

Feb. 9, 2006 (JP) ................................. 2006-031848

(51) Int. Cl.
*G06F 7/72* (2006.01)
(52) U.S. Cl.
USPC ........................................................ 708/491
(58) Field of Classification Search
None
See application file for complete search history.

(56) References Cited

U.S. PATENT DOCUMENTS

| | | | |
|---|---|---|---|
| 6,185,596 B1 | 2/2001 | Hadad et al. | |
| 6,748,410 B1 | 6/2004 | Gressel et al. | |
| 7,558,817 B2 | 7/2009 | Fischer et al. | |
| 7,904,498 B2 * | 3/2011 | Yoshino et al. | 708/491 |
| 2005/0149595 A1 | 7/2005 | Fischer et al. | |
| 2007/0185950 A1 * | 8/2007 | Yoshino et al. | 708/492 |
| 2011/0161390 A1 * | 6/2011 | Yoshino et al. | 708/491 |

OTHER PUBLICATIONS

A. Menezes, et al., "Multiple-Precision Modular Arithmetic", Handbook of Applied Cryptography, pp. 559-603, 1997.
W. Fischer, et al. "Increasing the Bitlength of a Crypto-Coprocessor", CHES 2002, vol. 2523 of Lecture Notes in Computer Science, Springer-Verlag, pp. 71-81, 2003.
Chevallier-Mames, et al., "Faster Double-Size Modular Multiplication from Euclidean Multipliers", CHES 2003, vol. 2779 of Lecture Notes in Computer Science, Springer-Verlag, pp. 214-227, 2003.
M. Kaihara, et al., "Bipartite Modular Multiplication", CHES 2005, vol. 3659 of Lecture Notes in Computer Science, Springer-Verlag, pp. 201-210, 2005.

\* cited by examiner

*Primary Examiner* — David H Malzahn
(74) *Attorney, Agent, or Firm* — Antonelli, Terry, Stout & Kraus, LLP.

(57) ABSTRACT

A modular multiplication processing apparatus is provided that can process modular multiplication of data exceeding a bit length which a coprocessor can readily process, by using the coprocessor based upon Montgomery multiplication In the modular multiplication processing apparatus, data to be subjected to modular multiplication is decomposed, and the decomposed data elements are transformed into a form suitable for Montgomery multiplication, respectively. Further, after respective data elements are transformed to have sizes that can be inputted into a coprocessor, Montgomery multiplication is repeatedly performed in the coprocessor. A remainder of Montgomery multiplication of an original bit length is restored from the obtained remainder.

10 Claims, 23 Drawing Sheets

MODULAR MULTIPLICATION PROCESSING APPARATUS

INCORPORATION BY REFERENCE

This application is a continuation of U.S. application Ser. No. 11/586,542, filed Oct. 26, 2006 now U.S. Pat. No. 7,904,498, and which application claims priority based on a Japanese patent application, No. 2006-031848 filed on Feb. 9, 2006, the entire contents of which are incorporated herein by reference.

BACKGROUND OF THE INVENTION

The present invention relates to a modular multiplication processing apparatus used in the field of security. More particularly, it relates to an implementation technique to a cryptosystem device mounted on a server, a smart card, or the like.
<Fundamentals of RSA Cryptosystem>

RSA cryptosystem that is the first public key cryptosystem in the world that was invented in 1978 has a nature that a key for encryption and a key for decryption are different and the key for encryption (public key) can be opened. In the RSA cryptosystem, modular exponentiation $C=L^e \mod K$ is performed in order to transform plaintext L to ciphertext C. Here, "e" and "K" are the public keys for encryption. In the RSA cryptosystem, decryption can be performed by only changing exponent from "e" to a value of a private key for decryption (private key) d. At least 1,024 bits are frequently used for modulus K that is the public key and the private key d in view of security.
<Demand for Fast.Modular Multiplication>

Time-consuming modular exponentiation is required in public key cryptosystem such as the RSA cryptosystem. Therefore, in an IC card (smart card) on which a CPU with high performance cannot be mounted or a server apparatus to which administrations are centralized, an execution time is often shortened by using a coprocessor implemented with modular multiplication as hardware. Especially, Montgomery multiplication described in A. Menezes, P. van Oorschot, S. Vanstone, Handbook of Applied Cryptography pp. 599-pp. 603 (1997) (herein, Document1) is known as a processing method of fast modular multiplication implemented on many hardwares. As a speed-up method of modular multiplication, a method applied with Montgomery multiplication (hereinafter, called "bipartite modular multiplication") is described in M. Kaihara, N. Takagi: "Bipartite Modular Multiplication" CHES2005, vol. 3659 of Lecture Notes in Computer Science, Springer-Verlag, pp. 201-210 (2005) (hereinafter, Document4).
<Decryption of RSA Cryptosystem>

Means for applying a method for dividing arithmetic operation to perform modular multiplication exceeding the number of bits in a coprocessor at high speed is known for processing RSA cryptosystem at high speed. In most of the methods, since information of a private key is required for the division of arithmetic operation, such methods can be utilized in decryption (or signature generation) processing of the RSA cryptosystem.
<Encryption of RSA Cryptosystem>

In encryption of RSA cryptosystem (or signature verification) processing, a research for performing modular multiplication exceeding the number of bits in a coprocessor at high speed like the decryption processing is described in W. Fischer, J.-P. Seifert: "Increasing the bit-length of crypto-coprocessors" CHES2002, vol. 2523 of Lecture Notes in Computer Science, Springer-Verlag, pp. 71-81 (2003) (hereinafter, called Document2) and Benoit Chevallier-Mames, Marc Joye, and Pascal Paillier: "Faster Double-Size Modular Multiplication From Euclidean Multipliers" CHES2003, vol. 2779 of Lecture Notes in Computer Science, Springer-Verlag, pp. 214-227 (2003) (hereinafter, called Document3). Since it is possible to perform modular multiplication of data with a bit length of at most twice (2n) the bit length of a coprocessor whose bit length is a positive integer n by using the coprocessor, encryption processing of RSA cryptosystem having a key length of at most 2n-bit can be performed using a coprocessor with n-bit.

SUMMARY OF THE INVENTION

When modular multiplication, especially, modular exponentiation is calculated, modular multiplication is frequently processed by hardware-implementing Montgomery multiplication on a coprocessor which allows fast processing. However, the following problems are included in the methods introduced in Document2 and Document3.

Problem 1: Utilization conditions for Montgomery multiplication are not assumed.

There is such a condition that moduli of modular multiplications must be coprime to Montgomery constant. Since such a case where the condition is not satisfied occurs in the methods introduced in Document2 and Document3, a coprocessor implemented with Montgomery multiplication cannot be utilized.

Problem 2: It is not guaranteed that modular multiplication for a bit length twice the bit length of a coprocessor can be processed.

According to Document2 and Document3, it is necessary to input the result of addition or subtraction of n-bit data into coprocessor in order to perform modular multiplication of the 2n-bits which is twice the number of bits (n-bit) of the coprocessor. However, since the number of bits of data obtained by addition or subtraction exceeds n in some cases, the coprocessor must process modular multiplication of n+α bits (α is a positive integer), which indicates that modular multiplication for twice the bit length of the coprocessor cannot be processed by the methods introduced in Document2 and Document3.

Problem 3: A coprocessor cannot perform modular multiplication correctly depending on a value of modulus inputted in a coprocessor.

According to Document2 and Document3, a value of 2n-bit from an upper (n+1) bits of data to be modulus has to be set in a coprocessor in order to perform modular multiplication of at most 2n-bit. Therefore, when the number of bits of the data to be modulus is equal to or less than n bits, since a value of modulus to be set in the coprocessor is not present (or 0), the coprocessor cannot perform modular multiplication correctly.

Problem 4: It is difficult in modular multiplication using Montgomery multiplication to acquire information required for doubling the bit length of modular multiplication in a coprocessor.

Montgomery multiplication introduced in Document1 is a method that is intended to process time-consuming modular multiplication through the multiplication which a computer is good at. In an ordinary modular multiplication, modulus is subtracted from a product of two numbers to be handled and a remainder is reserved on a lower side of the product. In Montgomery multiplication, however, modulus is added to a product and a remainder is reserved on an upper side of the product. In the ordinary modular multiplication, since the remainder is reserved on the lower side of the product of two numbers, a quotient can be obtained easily from a difference between two remainders obtained by inverting the least significant bit of modulus. In Document2 and Document3, information required for at most doubling a bit length is collected by obtaining not only a remainder of modular multiplication but also quotient thereof in order to realize modular multiplication for at most twice the bit length of a coprocessor based upon ordinary modular multiplication. In Montgomery multiplication, however, since quotient itself is not defined, it is difficult to collect information about the quotient when Montgomery multiplication is used.

The present invention has been made in order to overcome the above problems, and provides a modular multiplication processing apparatus that can process modular multiplication of data exceeding a bit length which a coprocessor can process, by using the coprocessor based upon Montgomery multiplication.

The typical ones of the inventions disclosed in this application will be briefly described as follows.

A modular multiplication processing apparatus according to the present invention is a modular multiplication processing apparatus which has a coprocessor that performs modular multiplication based upon Montgomery multiplication, and computes modular multiplication of data having a bit length that cannot be processed by the coprocessor, wherein a first processing unit which calculates a quotient and a remainder of Montgomery multiplication using a coprocessor is provided.

The modular multiplication processing apparatus according to the present invention further includes: a second processing unit which supplies data to be calculated to the first processing unit and calculates modular multiplication of data having a bit length which the coprocessor cannot process, by using the quotient and the remainder of Montgomery multiplication calculated by the first processing unit.

The modular multiplication processing apparatus according to the present invention further includes: a third processing unit which transforms a format of data inputted into the modular multiplication processing apparatus to a format suitable for the Montgomery multiplication.

The modular multiplication processing apparatus according to the present invention further includes: a fourth processing unit which inversely transforms a remainder of modular multiplication obtained by the second processing unit from a format suitable for the Montgomery multiplication to a format of the inputted data.

The modular multiplication processing apparatus according to the present invention further includes: a fifth processing unit which instructs repetition of modular exponentiation of data having a bit length which the coprocessor cannot process, in order for the second processing unit to compute modular exponentiation of data having a bit length which the coprocessor cannot process.

The modular multiplication processing apparatus according to the present invention further includes: a sixth processing unit which transforms the quotient and the remainder of Montgomery multiplication so that the quotient and the remainder of Montgomery multiplication fall within a fixed bit length.

Specifically, in the present invention, modular multiplication exceeding a bit length of modular multiplication that can be computed by a coprocessor is performed in the coprocessor which performs modular multiplication using Montgomery multiplication. In the present invention, digitized data to be handled is called "message".

In the present invention, inputted message to be subjected to modular multiplication is decomposed and transformed to a format suitable for Montgomery multiplication. After the message transformed to the format suitable for Montgomery multiplication is further transformed to a size that can be inputted into the coprocessor, it is inputted into the coprocessor. Modular multiplication is repeatedly performed in the coprocessor, and a quotient and a remainder of the Montgomery multiplication are obtained from a remainder of the modular multiplication based upon the format of Montgomery multiplication. The remainder of Montgomery multiplication is a remainder of Montgomery multiplication to a message having a bit length before inputted into the coprocessor. Also, the quotient of Montgomery multiplication indicates a parameter satisfying an equation defined by each message regarding Montgomery multiplication. A remainder of an inputted message can be obtained from remainders and quotients of a plurality of Montgomery multiplications. The obtained remainder is restored to the format of the original message from the format of modular multiplication that the coprocessor possesses.

The effects obtained by typical aspects of the present invention will be briefly described below.

According to the present invention, modular multiplication of data exceeding a bit length which a coprocessor can process can be processed by using a coprocessor based upon Montgomery multiplication.

These and other benefits are described throughout the present specification. A further understanding of the nature and advantages of the invention may be realized by reference to the remaining portions of the specification and the attached drawings.

DETAILED DESCRIPTION OF THE EMBODIMENTS

Hereinafter, embodiments of the present invention will be described in detail with reference to the accompanying drawings. Note that components having the same function are denoted by the same reference symbols throughout the drawings for describing the embodiment, and the repetitive description thereof will be omitted.

(First Embodiment)
<Whole Configuration of Communication System to Which Modular Multiplication Processing Apparatus is Applied>

Figure 1:
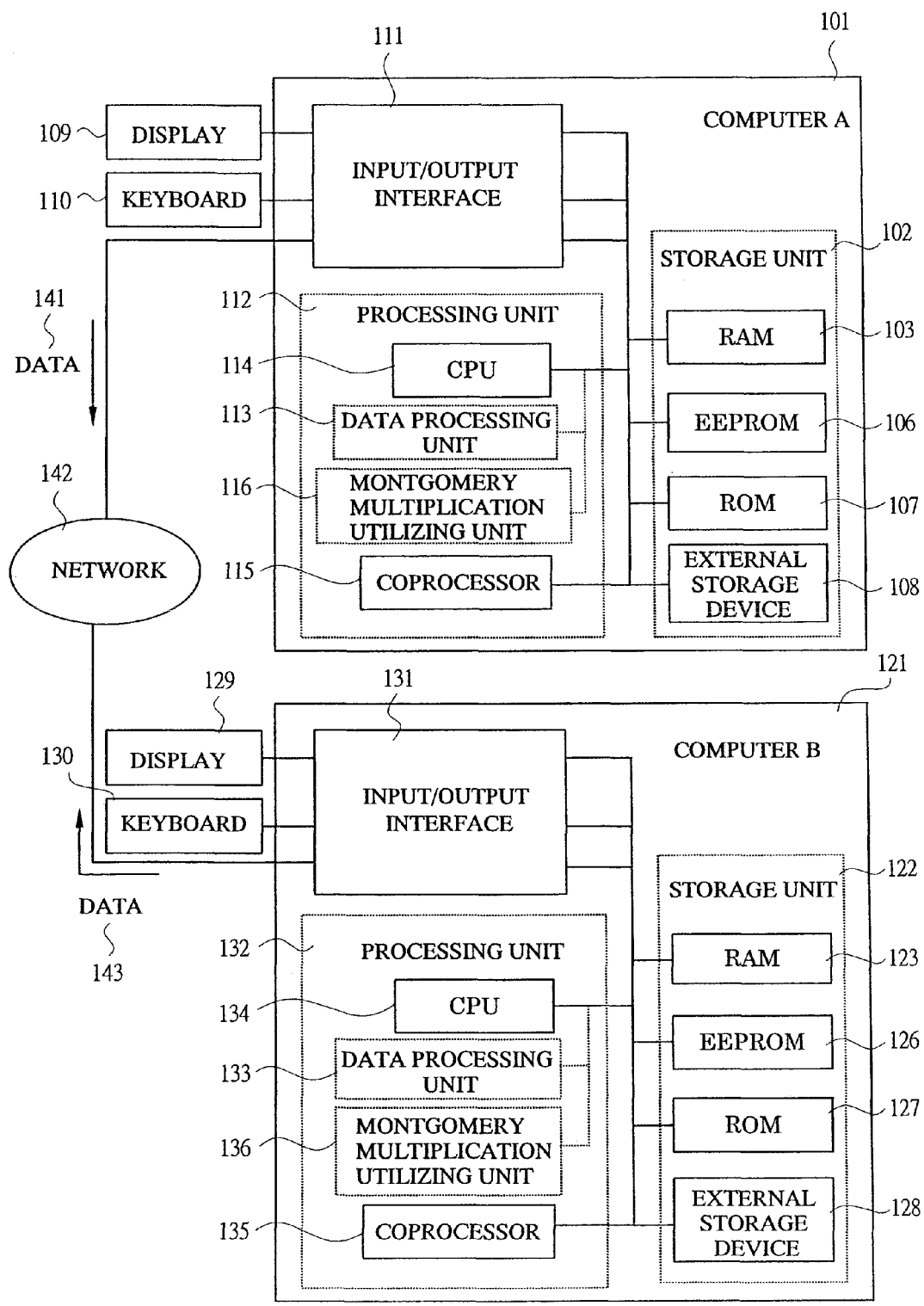
FIG. 1 shows an entire configuration of a communication system to which a first embodiment of the present invention has been applied.

A whole configuration of a communication system to which a modular multiplication processing apparatus according to a first embodiment of the present invention is applied will be described with reference to FIG. 1. The whole configuration of the communication system shown in FIG. 1 is basically common to the respective embodiments described below. FIG. 1 is a configuration diagram showing a whole configuration of a communication system to which the modular multiplication processing apparatus according to a first embodiment of the present invention is applied.

As shown FIG. 1, a computer A101 and a computer B121 are connected to each other via a network 142 in the communication system.

The computer A101 includes an operating device such as a CPU 114 and a coprocessor 115, a storage device such as a RAM 103, an EEPROM 106, a ROM 107, and an external storage device 108, and an input/output interface 111 for performing data input/output between the computer and devices disposed outside the computer. Also, a display 109, a keyboard 110, a reading/writing device for a detachable mobile storage medium, and the like that are disposed outside the computer A101 for user's operation are connected to the computer A101.

Further, in the computer A101, a storage unit 102 is realized utilizing storage devices such as the RAM 103, the ROM 107, the EEPROM 106, and the external storage device 108, and a processing unit 112 is realized by operating devices such as the CPU 114 and the coprocessor 115 which execute programs stored in the storage unit 102.

For example, different information is stored in the EEPROM 106 and the ROM 107 which configure the storage unit 102 for each of the program and the smart card, and intermediate data of calculation performed by the processing unit 112 is stored in the RAM 103.

The coprocessor 115 is a computing device or a computing program which executes modular multiplication, and it has an interface that receives two messages to be multiplied, a message to be modulus, and constants for modular multiplication as inputs and outputs a remainder of the modular multiplication. Also, the coprocessor 115 can perform modular multiplication to a message of at most n+h bits (n is a positive integer and h is an integer that is equal to or larger than 0 and less than n).

Similar to the computer A101, the computer B121 includes operating devices, storage devices, and an input/output interface 131, and a processing unit 132 is realized by a CPU 134 which executes programs.

In the configuration shown in FIG. 1, respective programs in the computer A101 and the computer B121 may be stored in the storage units 102 and 122 in the computer A101 and the computer B121 in advance, or they may be introduced into the storage units 102 and 122 via computers connected via the input/output interfaces 111 and 131 or via mediums that can be utilized by the computers when necessary. The medium indicates a storage medium detachable from the computers or a communication medium (namely, a network itself or a carrier wave or digital signal propagated through the network).

Operation of the processing unit in the computer B121 is similar to that in the computer A101, and it will be described below as the operation of the processing unit in the computer A101.

<Modular Multiplication Processing that a Processing Unit in a Computer Performs>

Figure 2:
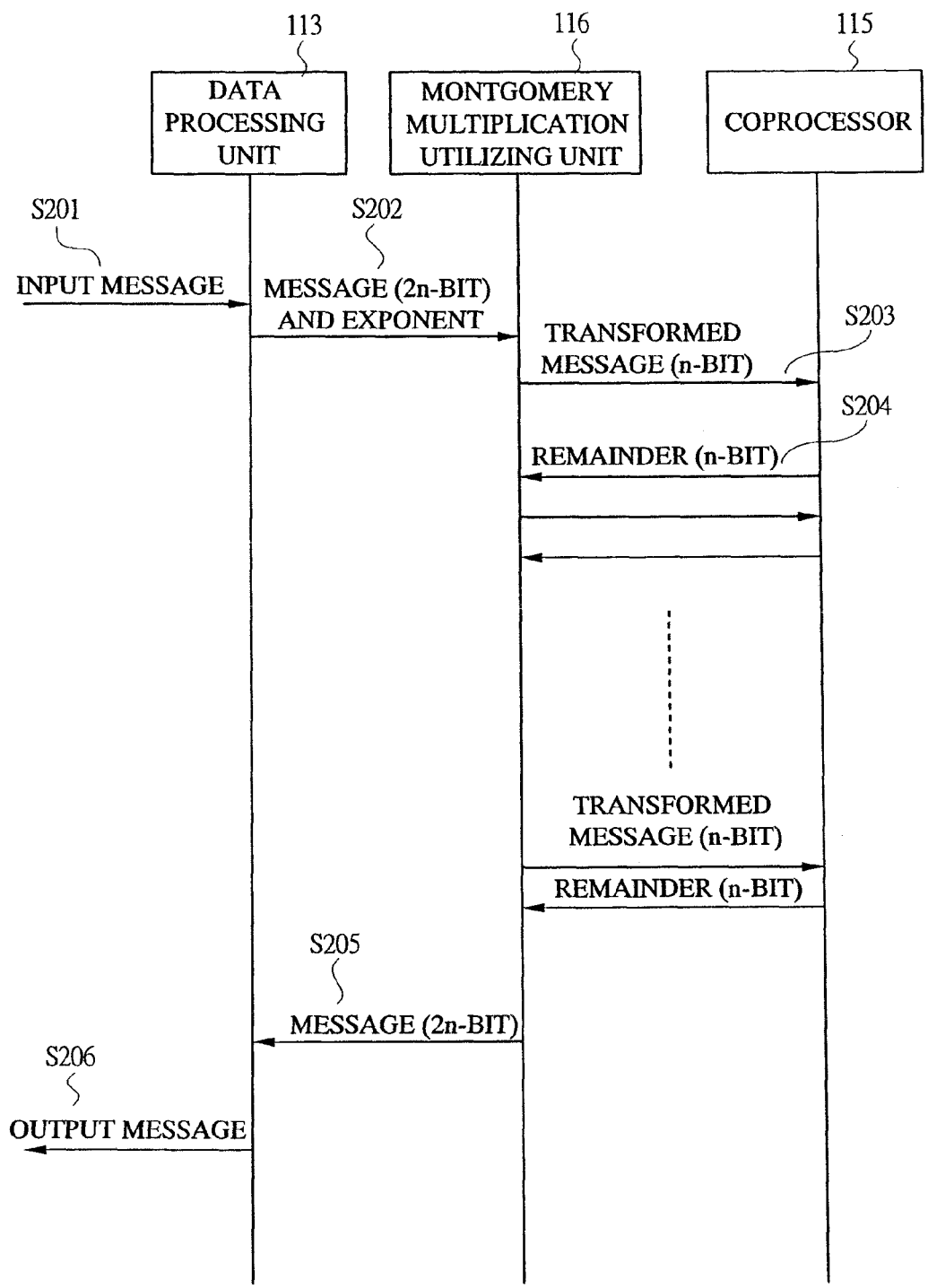
FIG. 2 exemplifies a sequence for delivery and reception of information performed by a processing unit in a computer to which the first embodiment of the present invention has been applied.

Next, modular multiplication processing that the processing unit in the computer in a communication system to which the modular multiplication processing apparatus according to the first embodiment of the present invention has been applied performs will be described with reference to FIG. 2. FIG. 2 is a sequence diagram showing an aspect of reception and delivery of information performed by the processing unit in the computer in the communication system to which the modular multiplication processing apparatus according to the first embodiment of the present invention has been applied.

In FIG. 2, an object to be subjected to modular multiplication is handled as a message. The message may be digitized data, and the kind thereof is not limited to a specific one such as text, image, video image, or sound.

The sequence diagram shown in FIG. 2 is basically common to respective embodiments described below.

When a message is inputted to the data processing unit 113 via the input/output interface 111 (S201), the data processing unit 113 determines whether or not a bit length of the input message is a predetermined bit length. When the bit length of the input message is longer than the predetermined bit length, the data processing unit 113 sections the message so that it has the predetermined bit length. The message (hereinafter, the sectioned message is simply called "message") sectioned to 2n bits as the predetermined bit length will be described below. Note that the symbol "n" is a positive integer in respective embodiments.

The data processing unit 113 outputs a message and an exponent to the Montgomery multiplication utilizing unit 116 (S202).

The Montgomery multiplication utilizing unit 116 first transforms the inputted massage to format suitable for modular multiplication that the coprocessor possesses. Next, a message corresponding to a bit size which can be received by the coprocessor 115 as input is outputted from the transformed message to the coprocessor 115 (S203). In the sequence diagram shown in FIG. 2, a message corresponding to a size of n-bit is outputted to the coprocessor 115.

In the coprocessor, a remainder of the inputted message is obtained and outputted to the Montgomery multiplication utilizing unit 116 (S204).

In the Montgomery multiplication utilizing unit 116 and the coprocessor 115, processings in steps S203 and S204 are repeated several times. The Montgomery multiplication utilizing unit 116 calculates a remainder composed of 2n-bit based upon the outputted remainder. In the Montgomery multiplication utilizing unit 116, the message is transformed from a format suitable for modular multiplication that the coprocessor possesses to the original integer expression and then outputted to the data processing unit 113 (S205).

In the data processing unit 113, an output message is obtained based on an inputted message and the output message is outputted to the input/output interface 111 or stored in the RAM 103, the ROM 107, the EEPROM 106, or the like (S206).

Regarding data reception and delivery between respective modules, instead of direct transfer of data, such a configuration may be adopted in which data is written in the storage unit 102 and a transfer destination module accesses the storage unit 102 to read the data.

Processing performed in the Montgomery multiplication utilizing unit 116 in the computer A101 will be described in detail below.

<Outline of Processing in Montgomery Multiplication Utilizing Unit>

In this embodiment, a first calculating method where the Montgomery multiplication utilizing unit 116 calculates modular multiplication based upon Montgomery multiplication for a message composed of 2n-bit.

<Function Blocks in Montgomery Multiplication Utilizing Unit>

Figure 3:
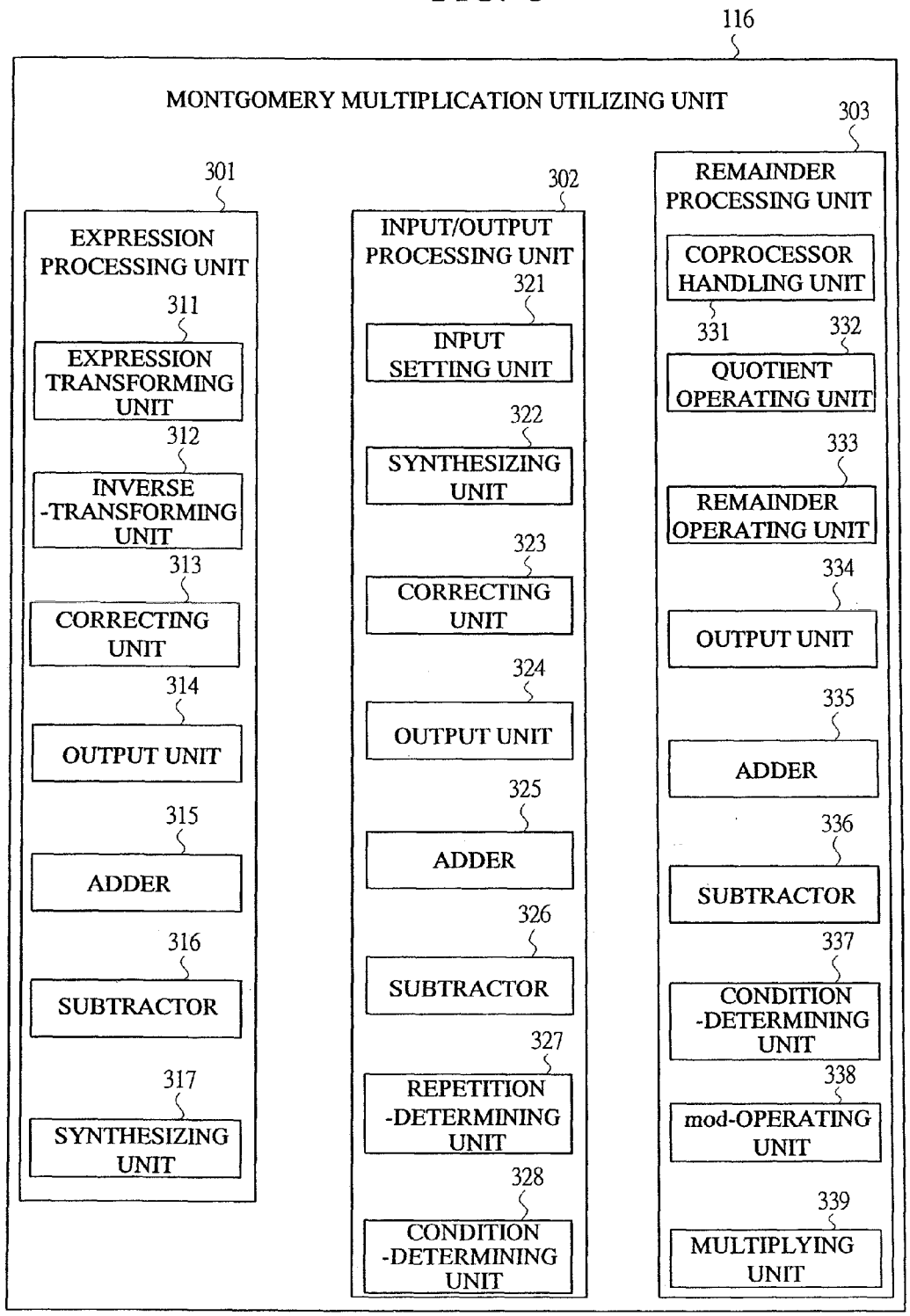
FIG. 3 exemplifies a configuration of a Montgomery multiplication utilizing unit 116 in the computer to which the first embodiment of the present invention has been applied.

A configuration of the Montgomery multiplication utilizing unit in the computer in the communication system to which the modular multiplication processing apparatus according to the first embodiment of the present invention has been applied will be described with reference to FIG. 3. FIG. 3 is a function block diagram showing a configuration of the Montgomery multiplication utilizing unit 116 in the computer in the communication system to which the modular multiplication processing apparatus according to the first embodiment of the present invention has been applied.

The Montgomery multiplication utilizing unit 116 has a function to exchange an n-bit message with the coprocessor 115 to obtain a remainder of modular multiplication based upon Montgomery multiplication of the 2n-bit message.

In FIG. 3, the Montgomery multiplication utilizing unit 116 includes an expression processing unit 301, an input/output processing unit 302, and a remainder processing unit 303.

The expression processing unit 301 includes an expression transforming unit 311, an inverse-transforming unit 312, a correcting unit 313, an output unit 314, an adder 315, a subtractor 316, and a synthesizing unit 317.

The input/output processing unit 302 includes an input setting unit 321, a synthesizing unit 322, a correcting unit 323, an output unit 324, an adder 325, a subtractor 326, a repetition-determining unit 327, and a condition-determining unit 328.

The remainder processing unit 303 includes a coprocessor handling unit 331, a quotient operating unit 332, a remainder operating unit 333, an output unit 334, an adder 335, a subtractor 336, a condition-determining unit 337, a mod-operating unit 338, and a multiplication unit 339.

Next, fundamental functions of respective function units and interfaces thereof will be described.

Interfaces and functions of the expressing transforming unit 311, the inverse-transforming unit 312, and the correcting unit 313 will be described for each embodiment. In Embodiment 1, the interfaces and functions will be described with reference to flowcharts shown in FIG. 5, FIG. 6, and FIG. 14.

The output unit 314 outputs an inputted message to the data processing unit 113 or the input/output processing unit 302.

The adder 315 receives two messages as inputs to prepare a message having a value obtained by adding values of the two messages and then outputs the prepared message to a function unit of the output source of the two messages.

The subtractor 316 receives two messages as inputs to prepare a message having a value obtained by subtracting a value of a second message from a value of a first message and then outputs the prepared message to a function unit of the output source of the two messages.

The synthesizing unit 317 receives two messages as inputs to synthesize the messages based upon a certain equation and then outputs the synthesized message to a function unit of the output source of the two messages.

An interface and a function of the input setting unit 321 will be described for each embodiment. In Embodiment 1, the interface and the function will be described with reference to flowcharts shown in FIG. 8, FIG. 9, FIG. 12, and FIG. 13.

The synthesizing unit 322 synthesizes inputted messages based upon a certain equation and then outputs the synthesized message to the output unit 324.

An interface and a function of the correcting unit 323 will be described below with reference to a flowchart shown in FIG. 14.

The output unit 324 outputs an inputted message to the expression processing unit 301 or the remainder processing unit 303.

The adder 325 receives two messages as inputs to prepare a message having a value obtained by adding values of the two messages and then outputs the prepared message to a function unit of the output source of the two messages.

The subtractor 326 receives two messages as inputs to prepare a message having a value obtained by subtracting a value of a second message from a value of a first message and then outputs the prepared message to a function unit of the output source of the two messages.

Interfaces and functions of the repetition-determining unit 327 and the condition-determining unit 328 will be described for each embodiment. In Embodiment 1, the interfaces and the functions will be described with reference to a flowchart shown in FIG. 7.

Interfaces and functions of the coprocessor handling unit 331, the quotient operating unit 332, and the remainder operating unit 333 will be described for each embodiment. In Embodiment 1, the interfaces and functions will be described with reference to flowcharts shown in FIG. 10 and FIG. 11.

The output unit 334 outputs an inputted message to the input/output processing unit 302.

The adder 335 receives two messages as inputs to prepare a message having a value obtained by adding values of the two messages and then outputs the prepared message to a function unit of the output source of the two messages.

The subtractor 336 receives two messages as inputs to prepare a message having a value obtained by subtracting a value of a second message from a value of a first message and then outputs the prepared message to a function unit of the output source of the two messages.

An interface and a function of the condition-determining unit 337 will be described for each embodiment. In Embodiment 1, the interface and the function will be described with reference to flowchart shown in FIG. 11.

The mod-operating unit 338 receives two messages as inputs to prepare a message having a value of a remainder obtained by dividing a value of the first message by a value of the second message and then outputs the prepared message to a function unit of the output source of the two messages.

The multiplication unit 339 receives two messages as inputs to prepare a message having a value of a product of values of the two messages and then outputs the prepared message to a function unit of the output source of the two messages.

The coprocessor handling unit 331, the quotient operating unit 332, the remainder operating unit 333, the adder 335, the subtractor 336, the condition-determining unit 337, the mod-operating unit 338, and the multiplication unit 339 in the remainder processing unit 303 constitute a first processing unit.

Also, the input setting unit 321, the synthesizing unit 322, the adder 325, and the subtractor 326 in the input/output processing unit 302 constitute a second processing unit, and the repetition-determining unit 327 and the condition-determining unit 328 in the input/output processing unit 302 constitute a fifth processing unit. Further, the correcting unit 323, the adder 325, and the subtractor 326 in the input/output processing unit 302 constitute a sixth processing unit.

Furthermore, the expression transforming unit 311, the adder 315, and the subtractor 316 in the expression processing unit 301 constitute a third processing unit, and the inverse transforming unit 312, the adder 315, the subtractor 316, and the synthesizing unit 317 in the expression processing unit 301 constitute a fourth processing unit.

<Processings in Montgomery Multiplication Utilizing Unit and Coprocessor>

Figure 4:
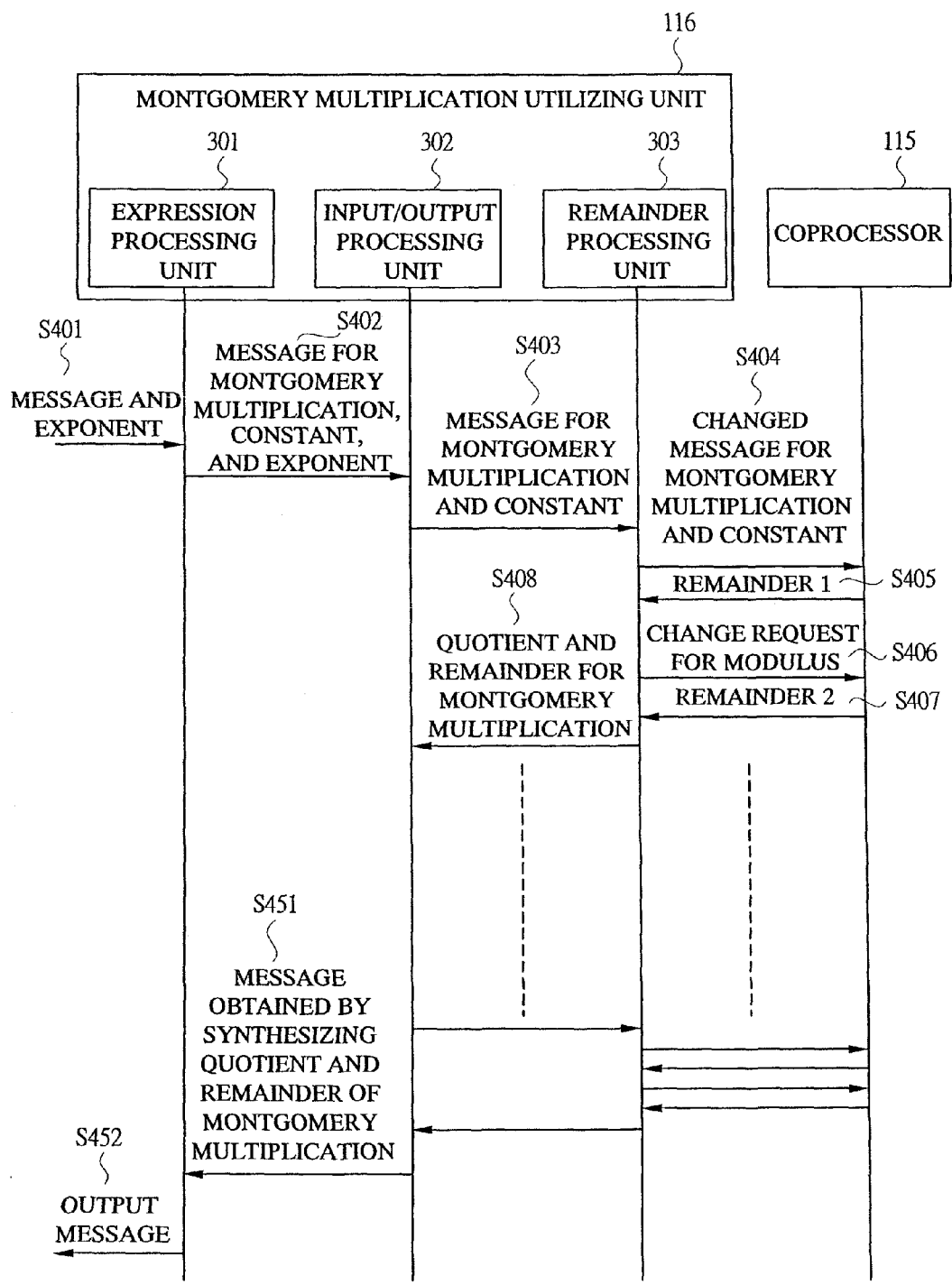
FIG. 4 exemplifies a processing sequence of the Montgomery multiplication utilizing unit and a coprocessor in the computer to which the first embodiment of the present invention has been applied.

Next, processings in the Montgomery multiplication utilizing unit and the coprocessor in the computer in the communication system to which the modular multiplication processing apparatus according to the first embodiment of the present invention has been applied will be described with reference to FIG. 4. FIG. 4 is a sequence diagram showing the processings in the Montgomery multiplication utilizing unit and the coprocessor in the computer in the communication system to which the modular multiplication processing apparatus according to the first embodiment of the present invention has been applied, and it exemplifies an aspect of message reception and delivery among the expression processing unit 301, the input/output processing unit 302, and the remainder processing unit 303 that are function blocks in the Montgomery multiplication utilizing unit 116, and the coprocessor 115.

First, a message and an exponent are inputted into the expression processing unit 301 (S401).

The expression processing unit 301 prepares a message transformed for Montgomery multiplication (hereinafter, called "message for Montgomery multiplication") based on the inputted message and then outputs the message for Montgomery multiplication to the input/output processing unit 302 together with a constant and an exponent used when the message for Montgomery multiplication is prepared (S402).

The input/output processing unit 302 selects an appropriate message from the inputted message for Montgomery multiplication and constant and then outputs the same (S403).

The remainder processing unit 303 changes values of the inputted message for Montgomery multiplication or constant to a size which can be accepted by the coprocessor 115 as an input and then outputs the same to the coprocessor 115 (S404).

The coprocessor 115 performs modular multiplication based upon the Montgomery multiplication using the inputted message to output the calculated result as a remainder 1. The remainder 1 outputted from the coprocessor 115 is inputted to the remainder processing unit 303 (S405). The remainder processing unit 303 outputs a request for a change of a set value of modulus of modular multiplication in the coprocessor 115 or a message which is new modulus (S406). After the coprocessor 115 changes a value of modulus of modular multiplication, it performs modular multiplication based upon Montgomery multiplication to output the calculated result as a remainder 2. The remainder 2 outputted from the coprocessor 115 is inputted to the remainder processing unit 303 (S407). The remainder processing unit 303 calculates a quotient and a remainder of the Montgomery multiplication defined by Equation 2 described later using the remainder 1 and the remainder 2 and then outputs them to the input/output processing unit 302 (S408).

The input/output processing unit 302, the remainder processing unit 303, and the coprocessor 115 repeat the continuous processings from step S403 to step S408 several times. The input/output processing unit 302 synthesizes a plurality of inputted quotients and remainders for Montgomery multiplication, and it determines whether the processing returns back to step S403 or proceeds to step S451 using an exponent.

The input/output processing unit 302 outputs a message obtained by synthesizing the quotients and remainders for Montgomery multiplication to the expression processing unit 301 (S451). The expression processing unit 301 transforms the inputted message obtained by synthesizing the quotients and remainders for Montgomery multiplication to the same format as that of the message inputted at step S401 and then outputs the same to the data processing unit 113 (S452).

<Processing in Expression Processing Unit>

Figure 5:
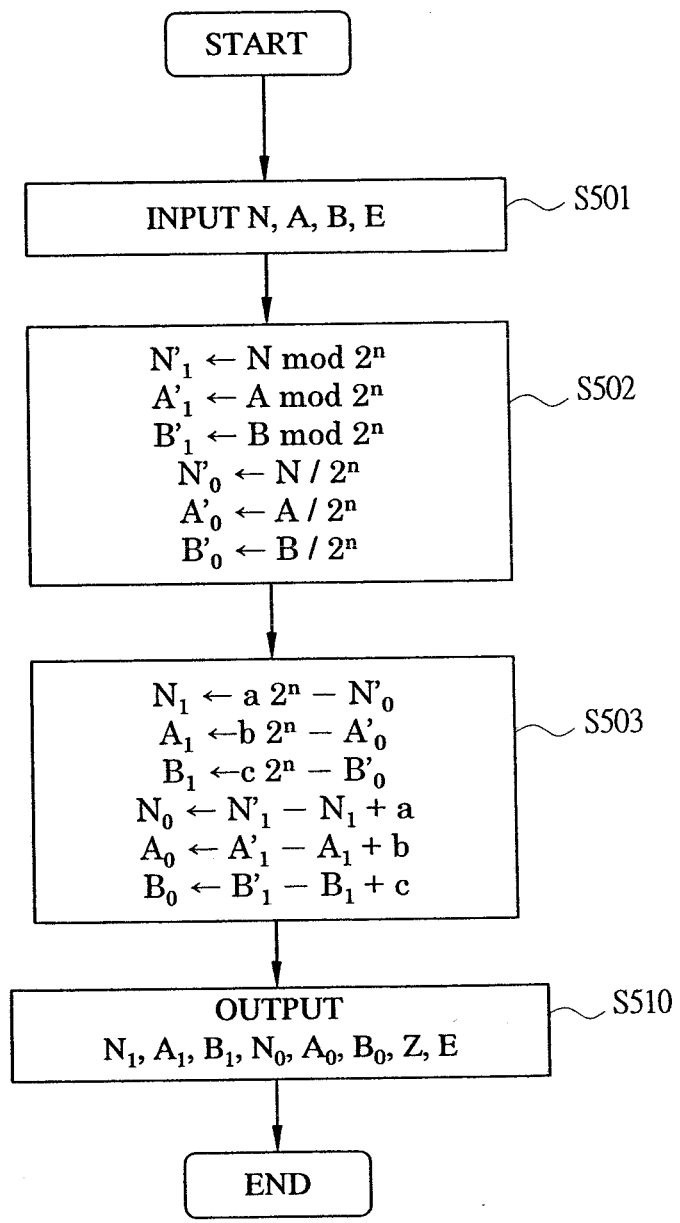
FIG. 5 exemplifies a transforming processing flow of integer expression performed by an expression processing unit in the computer to which the first embodiment of the present invention has been applied.
Figure 6:
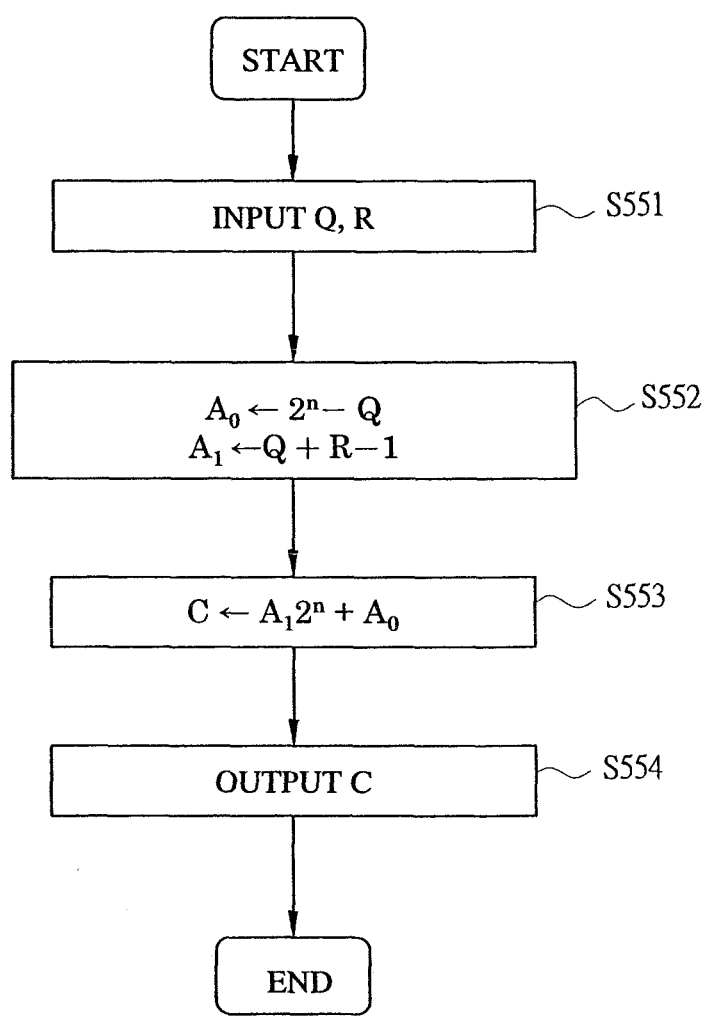
FIG. 6 exemplifies a transforming processing flow of integer expression performed by an expression processing unit in the computer to which the first embodiment of the present invention has been applied.

Next, a transformation processing of integer expression performed by the expression processing unit in the computer in the communication system to which the modular multiplication processing apparatus according to the first embodiment of the present invention has been applied will be described with reference to FIG. 5 and FIG. 6. FIG. 5 and FIG. 6 are flowcharts showing transformation processings of integer expression performed by the expression processing unit in the computer in the communication system to which the modular multiplication processing apparatus according to the first embodiment of the present invention has been applied.

The expression processing unit 301 has a function to transform a message to a message for Montgomery multiplication having a format suitable for Montgomery multiplication or perform inverse transformation from a message for Montgomery multiplication to output the same.

The format suitable for Montgomery multiplication indicates a format transformed so that a message has a similar portion with focusing attention on a portion corresponding to a product of a remainder and Montgomery constant in the following Equation 2 for obtaining a quotient and a remainder in Montgomery multiplication described in detail later.

$$XY = QN + RM \qquad \text{Equation 2}$$

For example, a message $N_1$ and a message $N_0$ for Montgomery multiplication transformed from a 2n-bit message N satisfies the following Equation 3.

$$N = M_1 Z + N_0 M \qquad \text{Equation 3}$$

Here, M represents Montgomery constant and Z represents $2^n - k$ (k is a positive odd number). The portion of a product of the message for Montgomery multiplication $N_0$ and the Montgomery constant M in Equation 3 corresponds to the portion of the product of the remainder and the Montgomery constant in Equation 2. There is such a condition that moduli of Montgomery multiplications must be coprime to Montgomery constant M. $N_1$ set later as modulus of Montgomery multiplication in the coprocessor 115 becomes coprime to the Montgomery constant M by setting Z to an odd number. Also, Equation 3 has a form similar to that of Equation 2, but it has an aspect where Z can be set so that calculation is facilitated. For example, when the value of Montgomery constant M becomes $2^n$, an equation for obtaining a message $N_1$ and a message $N_0$ from message N and an equation for obtaining the message N inversely can be easily derived by setting $Z = 2^n - 1$. In the following, a case of $k=1$ (namely, $Z = 2^n - 1$) will be described, but even if k takes another value, similar method can be performed.

A flowchart in FIG. 5 exemplifies a processing procedure performed until the expression processing unit 301 has transformed a 2n-bit message to a message for Montgomery multiplication.

First, a 2n-bit message A, a 2n-bit message B, a 2n-bit message N, and an exponent E are inputted to the expression transforming unit 311 in the expression processing unit 301 (S501).

The expression transforming unit 311 divides respective messages into upper n bits and lower n bits to prepare a message $A'_1$ and a message $A'_0$ from the message A, prepare a messages $B'_1$ and a message $B'_0$ from the message B, and prepare a message $N'_1$ and a message $N'_0$ from the message N, and the procedure proceeds to step S503 (S502). However, when a message less than 2n-bit is inputted in step S502, the expression transforming unit 311 performs padding of 0 from the most significant bit to regard the message as a 2n-bit message.

The expression transforming unit 311 prepares a message $N_1$, a message $N_0$, a message $A_1$, a message $A_0$, a message $B_1$, and a message $B_0$ so as to satisfy the Equation 3. For example, when the expression transforming unit 311 prepares the message $N_1$, the message $N_0$, the message $A_1$, the message $A_0$, the message $B_1$, and the message $B_0$ so as to satisfy the following equations, the Equation 3 can be satisfied.

$$N_1 = a2^n - N'_0$$

$$A_1 = b2^n - A'_0$$

$$B_1 = c2^n - B'_0$$

$$N_0 = N'_1 - N_1 + a$$

$$A_0 = A'_1 - A_1 + b$$

$$B_0 = B'_1 - B_1 + c, \text{ where } a, b \text{ and } c \text{ are positive integers.}$$

For example, such values as $a=1$, $b=1$, and $c=1$ are set.

For example, the expression transforming unit 311 performs calculation in the following manner. The expression transforming unit 311 stores a value of $(a2^n - N'_0)$ in the message $N_1$ through message exchange with the adder 315 and the subtractor 316. The expression transforming unit 311 can acquire a message $N_1$ having a value of $(a2^n - N'_0)$ by exchanging a constant $2^n$ with the adder 315 and outputting a message having the value outputted from the adder to the subtractor 316 and the message $N'_0$. The expression transforming unit 311 stores a value of $(N'_1 - N_1 + a)$ in the message $N_0$ through message exchange with the adder 315 and the subtractor 316. For example, the expression transforming unit 311 outputs a message having a value obtained by multiplying the constant $2^n$ by "a" and the message $N'_0$ and stores a value $(a2^n - N'_0)$ outputted from the subtractor 316 in the message $N_1$. The expression transforming unit 311 outputs the message $N'_1$ and the message $N_1$ to the subtractor 316, outputs a message having a value $(N'_1 - N_1)$ outputted from the subtractor 316 and the constant a to the adder 315, and stores a value $(N'_1 - N_1 + a)$ outputted from the adder 315 in the message $N_0$. The expression transforming unit 311 prepares the message $A_1$, the message $A_0$, the message $B_1$, and the message $B_0$ in the same manner as those of the message $N_1$ and the message $N_0$ (S503).

The expression transforming unit 311 outputs the message $N_1$, the message $N_0$, the message $A_1$, the message $A_0$, the message $B_1$, the message $B_0$, and the constant Z to the output unit 314. The output unit 314 outputs the inputted message $N_1$, message $N_0$, message $A_1$, message $A_0$, message $B_1$, message $B_0$, and message Z which is the constant (S510).

Next, a procedure performed until the inverse transforming unit 312 inversely transforms the message for Montgomery multiplication and then outputs the same will be described with reference to a flowchart shown in FIG. 6.

First, a message Q and a message R are inputted to the inverse transforming unit 312 (S551).

The inverse transforming unit 312 outputs the constant $2^n$ and the message Q to the subtractor 316. The subtractor 316 outputs a value obtained by subtracting a value of the message Q from the constant $2^n$. The inverse transforming unit 312 receives an outputted value $(2^n - Q)$ as an input and then stores the same in the message $A_0$. Accordingly, the message $A_0$, the constant $2^n$, and the message Q satisfy the following equation.

$$A_0 = 2^n - Q$$

The inverse transforming unit 312 exchanges messages with the adder 315 and the subtractor 316 to store a value of (Q+R−1) in the message $A_1$. For example, the inverse transforming unit 312 outputs the message Q and the message R to the adder 315. The adder 315 outputs a value obtained by adding a value of the message R to a value of the message Q. The inverse transforming unit 312 outputs the value received as an input as a message (Q+R) to the subtractor 316 together with the constant 1. The subtractor 316 outputs a value obtained by subtracting 1 from the value of the message (Q+R). The inverse transforming unit 312 receives the outputted value (Q+R−1) as an input to store the same in the message $A_1$. Accordingly, the message $A_1$, the message Q, the message R, and the constant 1 satisfy the following relational equation (S552).

$$A_1 = Q + R - 1$$

The inverse transforming unit 312 outputs the message $A_1$ and the message $A_0$ to the synthesizing unit 317. The synthesizing unit 317 uses the message $A_1$ and the message $A_0$ to prepare a value of $(A_1 2^n + A_0)$ and then output the same. The inverse transforming unit 312 stores the outputted value of $(A_1 2^n + A_0)$ in the message C (S553).

The inverse transforming unit 312 outputs the message C to the output unit 314. The output unit 314 outputs the inputted message C (S554).

<Processing in Input/Output Processing Unit>

Figure 7:
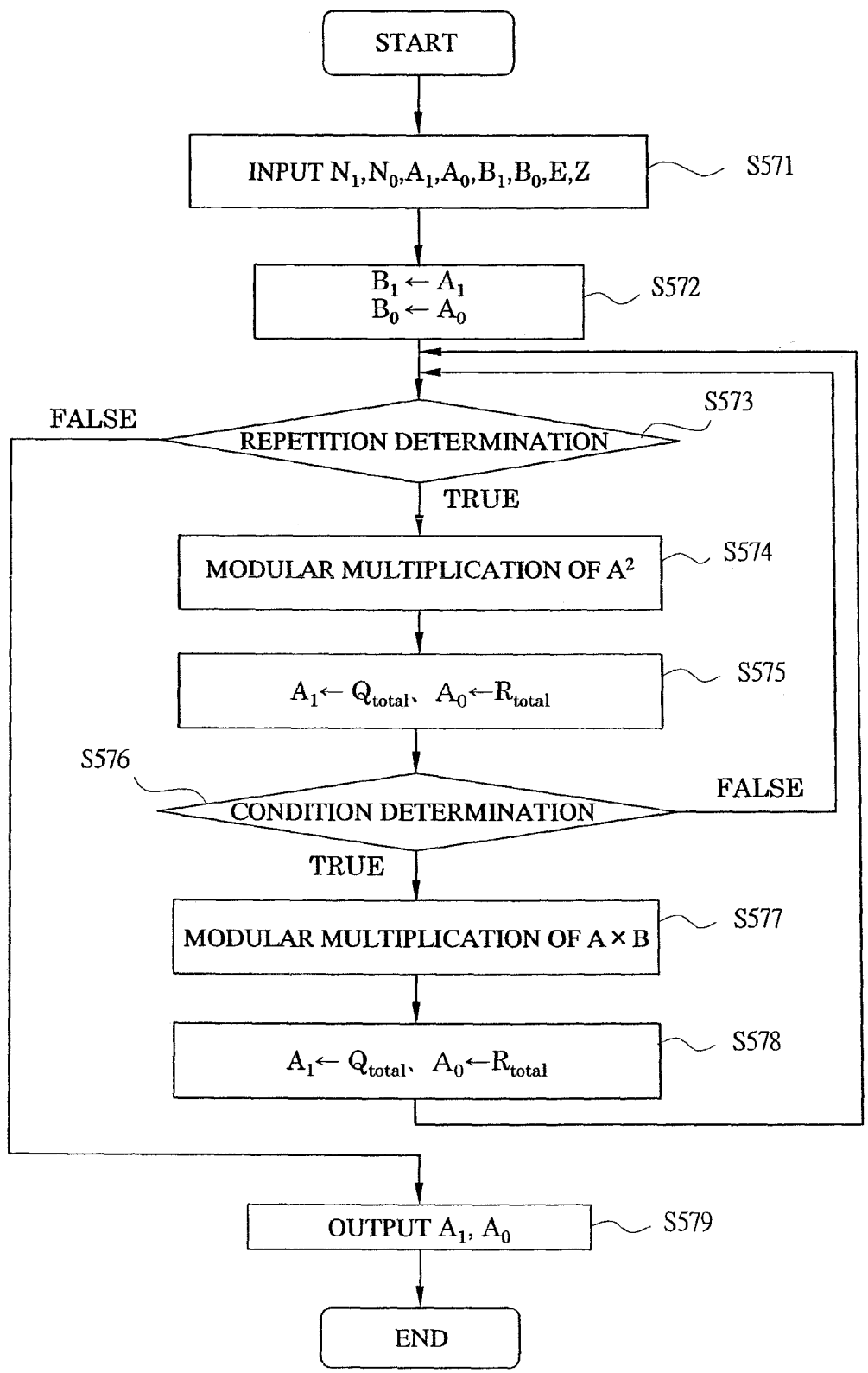
FIG. 7 exemplifies an input and output processing flow with a remainder processing unit performed by an input/output processing unit in the computer to which the first embodiment of the present invention has been applied.
Figure 8:
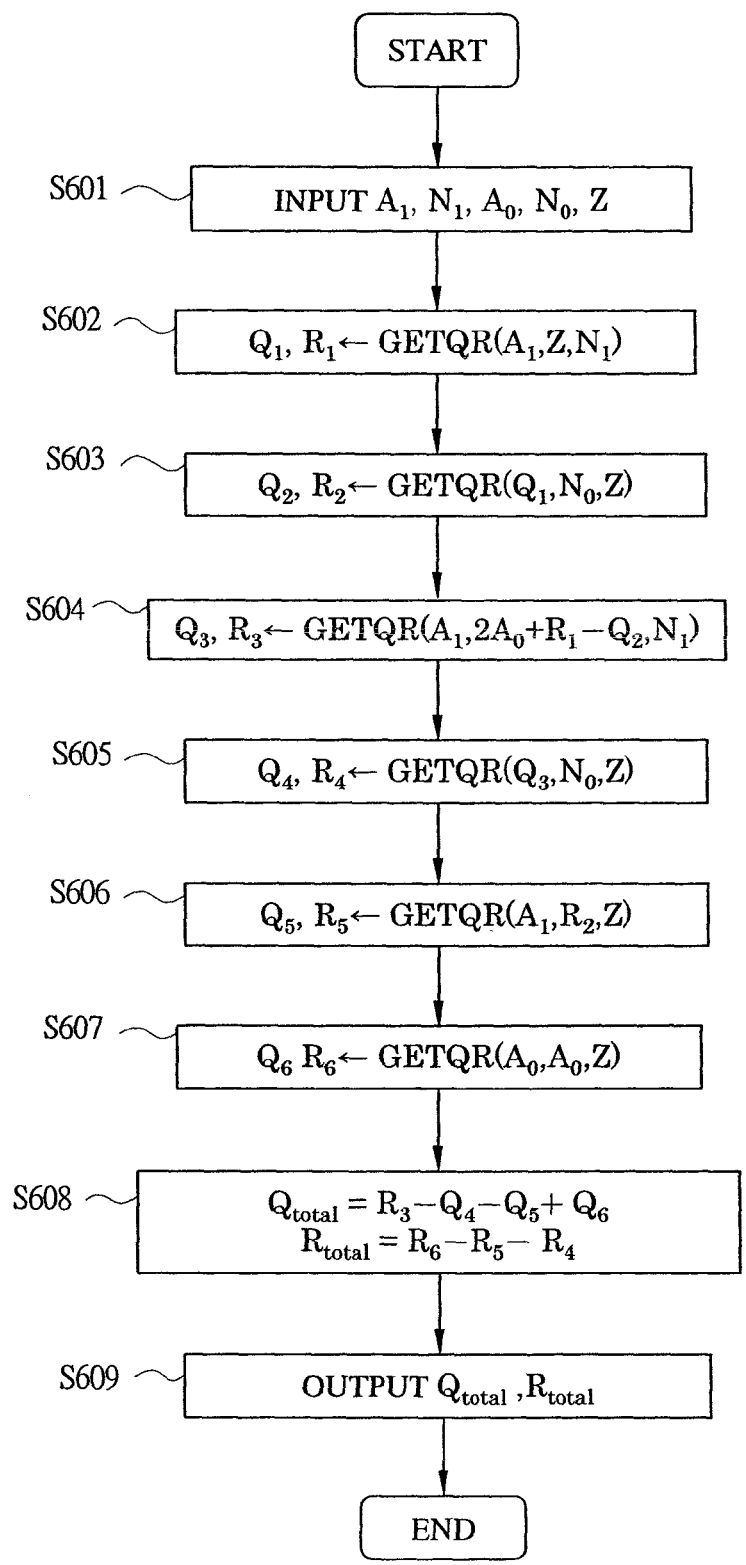
FIG. 8 exemplifies an input and output processing flow with a remainder processing unit performed by an input/output processing unit in the computer to which the first embodiment of the present invention has been applied.
Figure 9:
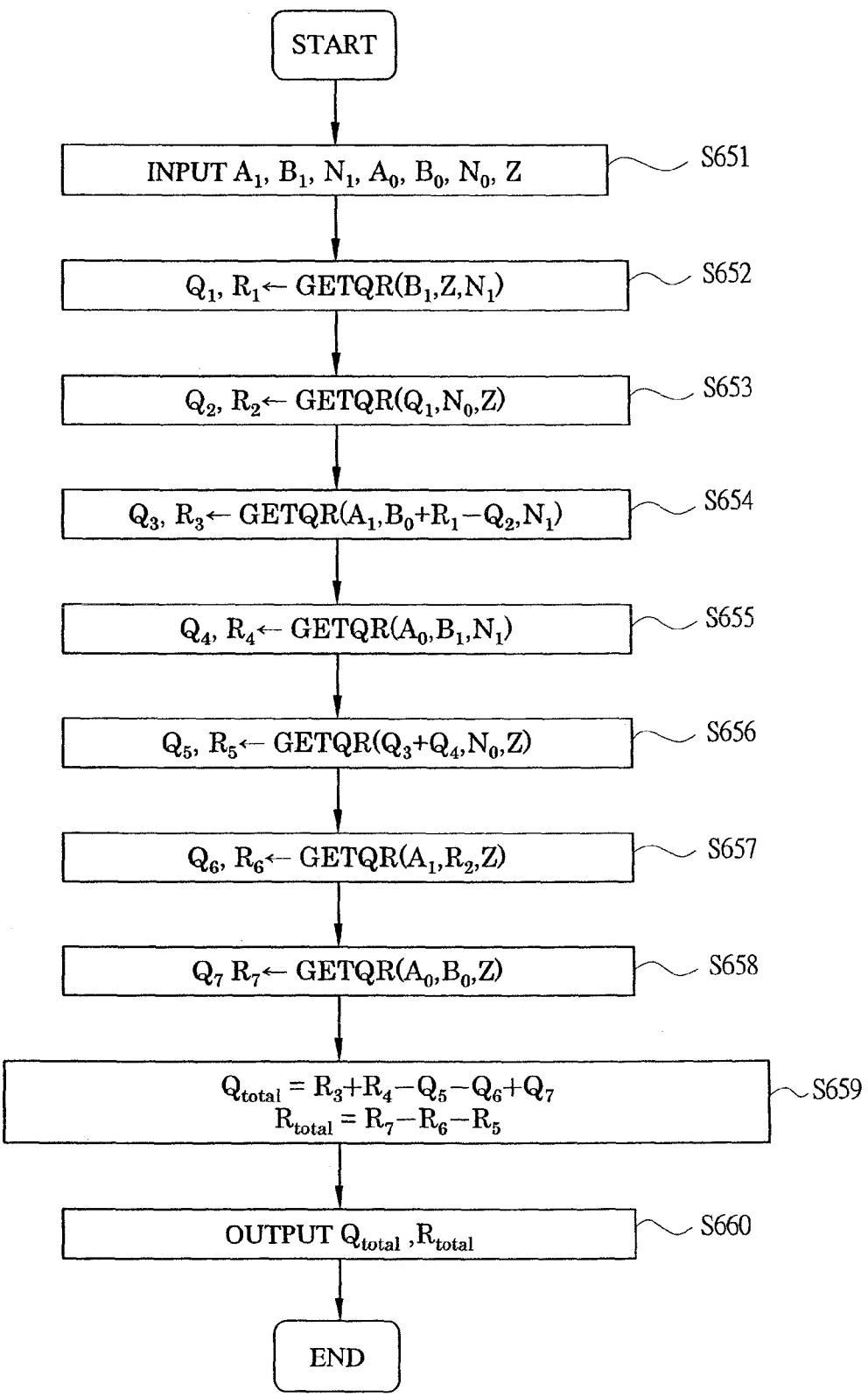
FIG. 9 exemplifies an input and output processing flow with a remainder processing unit performed by an input/output processing unit in the computer to which the first embodiment of the present invention has been applied.

Next, a processing in the input/output processing unit in the computer in the communication system to which the modular multiplication processing apparatus according to the first embodiment of the present invention has been applied will be described with reference to FIG. 7 to FIG. 9. FIG. 7 to FIG. 9 are flowcharts showing processings performed by the input/output processing unit in the computer in the communication system to which the modular multiplication processing apparatus according to the first embodiment of the present invention has been applied.

The input/output processing unit 302 has a function to output a message for Montgomery multiplication to the remainder processing unit 303 in order to perform modular multiplication based upon 2n-bit Montgomery multiplication. Also, the input/output processing unit 302 has a function to receive a message outputted from the remainder processing unit 303 as an input and calculate a remainder of modular multiplication based upon 2n-bit Montgomery multiplication to output the same.

FIG. 7 is a flowchart showing a processing procedure performed in the input/output processing unit 302 when modular exponentiation based upon Montgomery multiplication is calculated. Details of a processing procedure in step S574 in FIG. 7 are shown in FIG. 8, and details of a processing procedure in step S577 therein are shown in FIG. 9.

First, the message $N_1$, the message $N_0$, the message $A_1$, the message $A_0$, the message $B_1$, the message $B_0$, the exponent E, and the message Z are inputted into the repetition-determining unit 327 in the input/output processing unit 302 (S571).

The repetition-determining unit 327 stores the message $A_1$ and the message $A_0$ in the message $B_1$ and the message $B_0$, respectively.

The repetition-determining unit 327 determines whether or not modular exponentiation is required from a value of the exponent E. When required, the procedure proceeds to step S574, while when not required, it proceeds to step S579. In one example of the determining method, a variable i having a value of 0 is prepared and the variable i to be determined is changed in each arrival of the repetition-determining unit 327 at step S573, and the repetition-determining unit 327 determines that the modular exponentiation is required when the value of variable i is not equal to the value of exponent E and then proceeds to step S574. Meanwhile, the repetition-determining unit 327 determines that the modular exponentiation is not required when the value of variable i is equal to the value of the exponent E and then proceeds to step S579 (step S573).

The repetition-determining unit 327 outputs the message $A_1$, the message $A_0$, the message $N_1$, the message $N_0$, and the message Z to the input/output setting unit 321 (S574).

The input setting unit 321 performs processings (described later) from step S601 to step S609 to output a message $Q_{total}$ and a message $R_{total}$. The repetition-determining unit 327 stores the outputted message $Q_{total}$ and message $R_{total}$ in the message $A_1$ and message $A_0$, respectively (S575).

The condition-determining unit 328 determines whether or not modular multiplication of A×B in step S577 is required from the value of the exponent E. If required, the procedure proceeds to step S577, while, if not required, it proceeds to step S573. In one example of the determining method, a variable j having the bit number of the exponent E as a value is prepared and the variable j to be determined is halved in each arrival of the repetition-determining unit 327 at step S576, and when the (j−1)-th value of the exponent E at the time of development of the exponent E to a binary number is equal to 1, the condition-determining unit 328 determines that the modular multiplication is required and proceeds to step S577. Meanwhile, when the value is equal to 0, the condition-determining unit 328 determines that the modular multiplication is not required and proceeds to step S573 (S576).

The repetition-determining unit 327 outputs the message $A_1$, the message $A_0$, the message $B_1$, the message $B_0$, the message $N_1$, the message $N_0$, and the message Z to the input setting unit 321 (S577).

The input setting unit 321 performs processings (described later) from step S651 to step S660 to output the message $Q_{total}$ and the message $R_{total}$. The repetition-determining unit 327 stores the outputted message $R_{total}$ and message $Q_{total}$ in the message $A_1$ and the message $A_0$, respectively (S578).

The repetition-determining unit 327 outputs the message $A_1$, and the message $A_0$ to the output unit 324. The output unit 324 outputs the received message $A_1$ and message $A_0$ (S579).

FIG. 8 is a flowchart showing a processing in the input/output processing unit 302 in the case where Montgomery multiplication of squaring of the message A having the message N as modulus is calculated. A processing procedure where a message is outputted from the input/output processing unit 302 to the remainder processing unit 303 and a remainder of 2n-bit Montgomery multiplication is calculated using a quotient and a remainder of the Montgomery multiplication outputted from the remainder processing unit 303 will be described with reference to FIG. 8.

The input setting unit 321 repeats the input and output of messages from/to the remainder processing unit 303 (from step S602 to step S607). The remainder processing unit 303 receives three messages as inputs and outputs two messages. Note that the input and output of messages from;/to the remainder processing unit 303 is represented using a function GETQR in FIG. 8.

First, the message $A_1$, the message $N_1$, the message $A_0$, the message $N_0$, and the message Z are inputted into the input setting unit 321 (S601).

The input setting unit 321 outputs the message $A_1$, the message Z, and the message $N_1$ to the Montgomery multiplication utilizing unit 116 and stores the quotient and the remainder of Montgomery multiplication outputted from the remainder processing unit 303 in a message $Q_1$ and a message $R_1$ (S602).

The processing procedure from step S603 to step S607 conforms to step S602.

The input setting unit 321 outputs the message $Q_1$, the message $N_0$, and the message Z to the Montgomery multiplication utilizing unit 116 and stores the quotient and the remainder of Montgomery multiplication outputted from the remainder processing unit 303 in a message $Q_2$ and a message $R_2$ (S603).

The input setting unit 321 exchanges messages with the adder and subtractor to obtain a message $(2A_0+R_1-Q_2)$ having a value of $(2A_0+R_1-Q_2)$.

The input setting unit 321 outputs the message $A_1$, the message $(2A_0+R_1-Q_2)$, and the message $N_1$ to the Montgomery multiplication utilizing unit 116 and stores the quotient and the remainder of Montgomery multiplication outputted from the remainder processing unit 303 in a message $Q_3$ and a message $R_3$ (S604).

The input setting unit 321 outputs the message $Q_3$, the message $N_0$, and the message Z to the Montgomery multiplication utilizing unit 116 and stores the quotient and the remainder of Montgomery multiplication outputted from the remainder processing unit 303 in a message $Q_4$ and a message $R_4$ (S605).

The input setting unit 321 outputs the message $A_1$, the message $R_2$, and the message Z to the Montgomery multiplication utilizing unit 116 and stores the quotient and the remainder of Montgomery multiplication outputted from the remainder processing unit 303 in a message $Q_5$ and a message $R_5$ (S606).

The input setting unit 321 outputs the message $A_0$, the message $A_3$, and the message Z to the remainder processing unit 303 and stores the quotient and the remainder of Montgomery multiplication outputted from the remainder processing unit 303 in a message $Q_6$ and a message $R_6$ (S607).

The input setting unit 321 outputs the message $R_3$, the message $R_4$, the message $R_5$, the message $R_6$, the message $Q_4$, the message $Q_5$, and the message $Q_6$ to the synthesizing unit 322. The synthesizing unit 322 calculates $Q_{total}$ and $R_{total}$ satisfying the following equations (S608).

$$Q_{total}=R_3-Q_4-Q_5+Q_6$$

$$R_{total}=R_6-R_5-R_4$$

For example, the synthesizing unit 322 performs calculation in the following manner. The synthesizing unit 322 outputs the message $R_3$ and the message $Q_4$ to the subtractor 326. The subtractor 326 subtracts a value of the message $Q_4$ from the message $R_3$ and then outputs the obtained value as a message. The subtractor 326 receives the outputted message $(R_3-Q_4)$ as an input and then outputs the same together with the message $Q_5$ to the subtractor 326. The subtractor 326 subtracts a value of the message $Q_5$ from the message $(R_3-Q_4)$ and then outputs the obtained value as a message. The subtractor 326 receives the outputted message $(R_3-Q_4-Q_5)$ as an input and then outputs the same together with the message $Q_6$ to the adder 325. The adder 325 adds a value of the message $Q_6$ to the message $(R_3-Q_4-Q_5)$ and then outputs the obtained value as a message. The synthesizing unit 322 receives the outputted message $(R_3-Q_4-Q_5+Q_6)$ as an input and then stores the same in the message $Q_{total}$. Accordingly, the message $Q_{total}$, the message $R_3$, the message $Q_4$, the message $Q_5$, and the message $Q_6$ satisfy the following relational equation.

$$Q_{total}=R_3-Q_4-Q_5+Q_6$$

The synthesizing unit 322 outputs the message $R_6$ and the message $R_5$ to the subtractor 326. The subtractor 326 subtracts a value of the message $R_5$ from the message $R_6$ and then outputs the obtained value. The subtractor 326 receives the outputted message $(R_6-R_5)$ as an input and then outputs the same together with the message $R_6$ to the subtractor 326. The subtractor 326 subtracts a value of the message $R_4$ from the message $(R_6-R_5)$ and then outputs the obtained value as a message. The synthesizing unit 322 receives the outputted message $(R_6-R_5-R_4)$ as an input and then stores the same in the message $R_{total}$. Accordingly, the message $R_{total}$, the message $R_4$, the message $R_5$, and the message $R_6$ satisfy the following relational equation.

$$R_{total}=R_6-R_5-R_4$$

The synthesizing unit 322 outputs the message $Q_{total}$ and the message $R_{total}$ to the output unit 324. The output unit 324 outputs the inputted message $Q_{total}$ and message $R_{total}$ (S609).

FIG. 9 is a flowchart showing a processing in the input/output processing unit 302 in the case where Montgomery multiplication of the message A and the message B having the message N as modulo is calculated. A processing procedure where a message is outputted from the input/output processing unit 302 to the remainder processing, unit 303 and a remainder of 2n-bit Montgomery multiplication is calculated using a quotient and a remainder of Montgomery multiplication outputted from the remainder processing unit 303 will be described with reference to FIG. 9.

The input setting unit 321 repeats the input and output of message from/to the remainder processing unit 303 (from step S652 to step S658).

First, the message $A_1$, the message $B_1$, the message $N_1$, the message $A_0$, the message $B_0$, the message $N_0$, and the message Z are inputted into the input setting unit 321 (S651).

The input setting unit 321 outputs the message $B_1$, the message Z, and the message $N_1$ to the remainder processing unit 303. The remainder processing unit 303 performs calculation based upon the inputted message $B_1$, message Z, and message $N_1$ and the input setting unit 321 stores an outputted quotient and remainder of Montgomery multiplication in a message $Q_1$ and a message $R_1$ (S652).

The processing similar to the processing in step S652 is repeated in a processing from step S653 to step S658.

The input setting unit 321 outputs the message $Q_1$, the message $N_0$, and the message Z to the remainder processing unit 303 and then stores a quotient and a remainder of Montgomery multiplication outputted from the remainder processing unit 303 in a message $Q_2$ and a message $R_2$ (S653).

The input setting unit 321 exchanges message with the adder and the subtractor to obtain a message $(B_0+R_1-Q_2)$ having a value of $(B_0+R_1-Q_2)$.

The input setting unit 321 outputs the message $A_1$, the message $(B_0+R_1-Q_2)$, and the message $N_1$ to the remainder processing unit 303 and then stores a quotient and a remainder of Montgomery multiplication outputted from the remainder processing unit 303 in a message $Q_3$ and a message $R_3$ (S654).

The input setting unit 321 outputs the message $A_0$, the message $B_1$, and the message $N_1$ to the remainder processing unit 303 and then stores a quotient and a remainder of Montgomery multiplication outputted from the remainder processing unit 303 in a message $Q_4$ and a message $R_4$ (S655).

The input setting unit 321 exchanges a message with the adder to obtain a message $(Q_3+Q_4)$ having a value of $Q_3+Q_4$.

The input setting unit 321 outputs the message $(Q_3+Q_4)$, the message $N_0$, and the message Z to the remainder processing unit 303 and then stores a quotient and a remainder of Montgomery multiplication outputted from the remainder processing unit 303 in a message $Q_5$ and a message $R_5$ (S656).

The input setting unit 321 outputs the message $A_1$, the message $R_2$, and the message Z to the remainder processing unit 303 and then stores a quotient and a remainder of Montgomery multiplication outputted from the remainder processing unit 303 in a message $Q_6$ and a message $R_6$ (S657).

The input setting unit 321 outputs the message $A_0$, the message $B_0$, and the message Z to the remainder processing unit 303 and then stores a quotient and a remainder of Montgomery multiplication outputted from the remainder processing unit 303 in a message $Q_7$ and a message $R_7$ (S658).

The input setting unit 321 outputs the message $R_3$, the message $R_4$, the message $R_5$, the message $R_6$, the message $Q_4$, the message $Q_5$, and the message $Q_6$ to the synthesizing unit 322. Then, the synthesizing unit 322 calculates the message $Q_{total}$ and the message $R_{total}$ satisfying the following equations (S659).

$$Q_{total}=R_3+R_4-Q_5-Q_6+Q_7$$

$$R_{total}=R_7-R_6-R_5$$

For example, the synthesizing unit 322 can calculate the message $Q_{total}$ and the message $R_{total}$ in the following manner. The synthesizing unit 322 outputs the message $R_3$ and the message $R_4$ to the adder 325. The adder 325 adds a value of the message $R_4$ to the message $R_3$ and outputs the added value as a message. The synthesizing unit 322 receives the outputted message $(R_3+R_4)$ as an input and then outputs the same together with the message $Q_5$ to the subtractor 326. The subtractor 326 subtracts a value of the message $Q_5$ from the message $(R_3+R_4)$ and outputs the obtained value as a message. The subtractor 326 received the outputted message $(R_3+R_4-Q_5)$ as an input and then outputs the same together with the message $Q_6$ to the subtractor 326. The subtractor 326 subtracts a value of the message $Q_6$ from the outputted message $(R_3+R_4-Q_5)$ and outputs the obtained value as a message. The subtractor 326 receives the outputted message $(R_3+R_4-Q_5-Q_6)$ as an input and outputs the same together with the message $Q_7$ to the adder 325. The adder 325 adds a value of the message $Q_7$ to the message $(R_3+R_4-Q_5-Q_6)$ and then outputs the obtained value as a message. The synthesizing unit 322 receives the outputted message $(R_3+R_4-Q_5-Q_6+Q_7)$ as an input and then stores the same in the message $Q_{total}$. Accordingly, the message $Q_{total}$, the message $R_3$, the message $R_4$, the message $Q_5$, the message $Q_6$, and the message $Q_7$ satisfy the following relational equation.

$$Q_{total}=R_3+R_4-Q_5-Q_6+Q_7$$

The synthesizing unit 322 outputs the message $R_7$ and the message $R_6$ to the subtractor 326. The subtractor 326 subtracts a value of the message $R_6$ from the message $R_7$ and then outputs the obtained value as a message. The subtractor 326 receives the outputted message $(R_7-R_6)$ as an input and then outputs the same together with the message $R_5$ to the subtractor 326. The subtractor 326 subtracts a value of the message $R_5$ from the message $(R_7-R_6)$ and then outputs the obtained value as a message. The synthesizing unit 322 receives the message $(R_7-R_6-R_5)$ as an input and then stores the same in the message $R_{total}$. Accordingly, the message $R_{total}$, the message $R_5$, the message $R_6$, and the message $R_7$ satisfy the following relational equation (S659).

$$R_{total}=R_7-R_6-R_5$$

The synthesizing unit 322 outputs the message $Q_{total}$ and the message $R_{total}$ to the output unit 324. The output unit 324 outputs the received message $Q_{total}$ and message $R_{total}$ (S660).

<Processing in Remainder Processing Unit>

Figure 10:
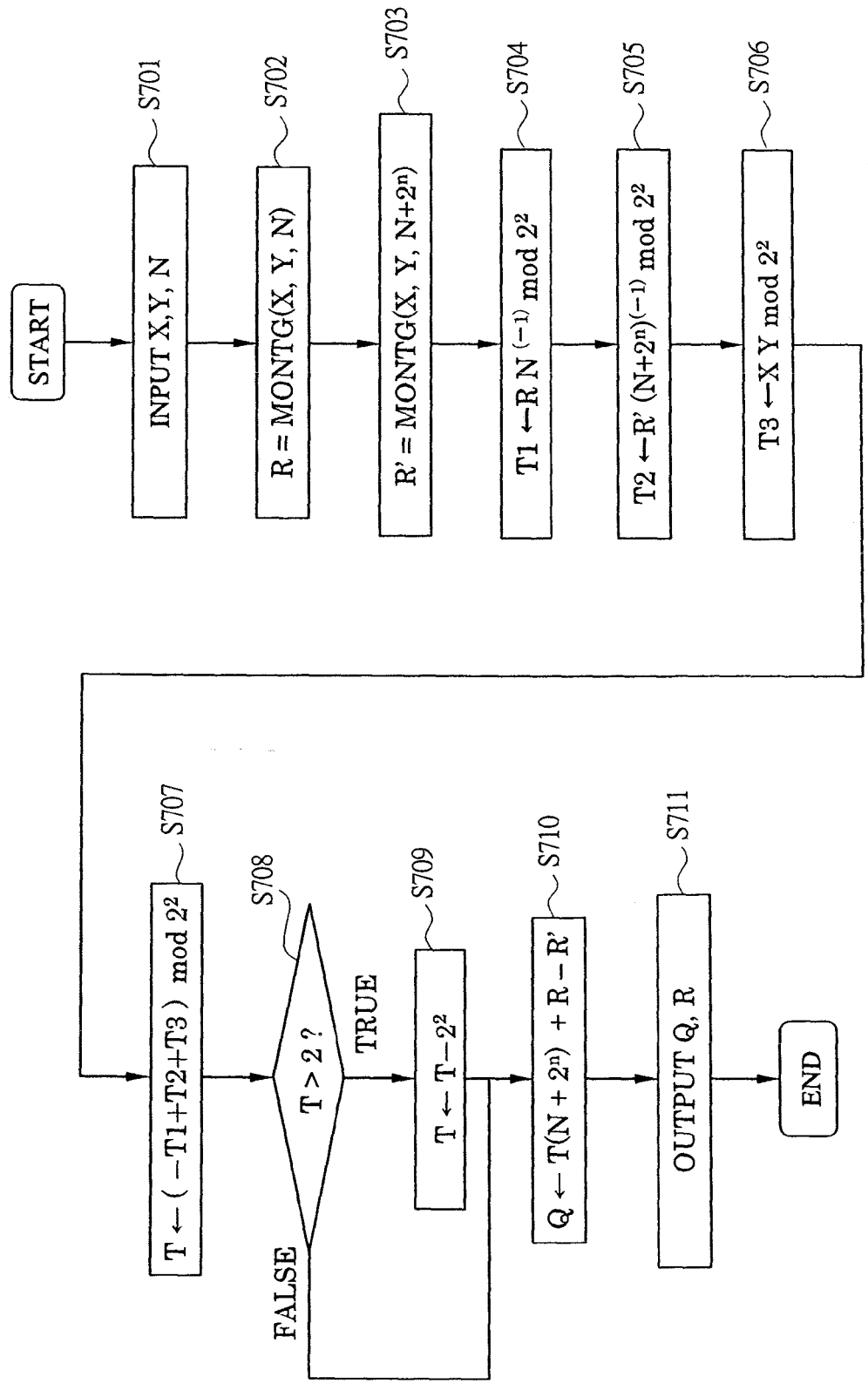
FIG. 10 exemplifies a processing flow in the remainder processing unit in the computer to which the first embodiment of the present invention has been applied.
Figure 11:
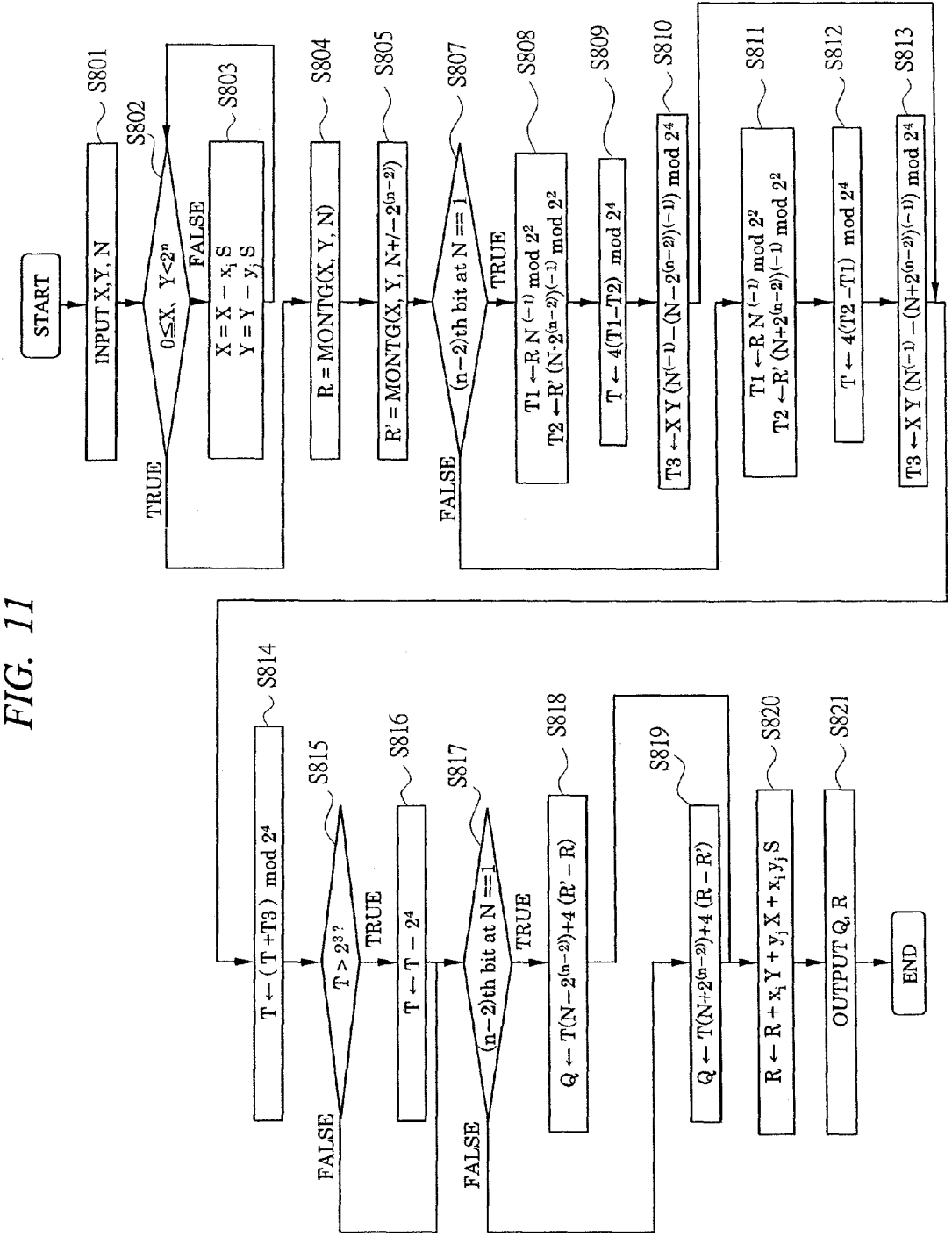
FIG. 11 exemplifies a processing flow in the remainder processing unit in the computer to which the first embodiment of the present invention has been applied.

Next, a processing in the remainder processing unit in the computer in the communication system to which the modular multiplication processing apparatus according to the first embodiment of the present invention has been applied will be described with reference to FIG. 10 and FIG. 11. FIG. 10 and FIG. 11 are flowcharts showing processings in the remainder processing unit in the computer in the communication system to which the modular multiplication processing apparatus according to the first embodiment of the present invention has been applied.

First, a remainder $R_0$ calculated using Montgomery multiplication satisfies the following equation.

$$R_0 = XYM^{(-1)} \bmod N \qquad \text{Equation 1}$$

Here, X and Y represent arbitrary messages, M represents Montgomery constant, and N represents an arbitrary message to be modulus. In general, a value of Montgomery constant M is set to $2^n$ in many cases in order to facilitate the calculation.

The remainder processing unit 303 has a function to obtain a quotient and a remainder of Montgomery multiplication with using the inputted message and the remainder inputted from the coprocessor 115. The quotient and the remainder of Montgomery multiplication indicate Q and R satisfying the following equation.

$$XY = QN + RM \qquad \text{Equation 2}$$

Equation 2 can be obtained by transforming Equation 1. In Equation 2, Montgomery constant M in the left-hand member of Equation 1 is a multiplier of the remainder R, and a multiplicand to the modulus N is the quotient Q. An equation defined by using a quotient for Montgomery multiplication utilized as a method for obtaining a remainder is Equation 2.

FIG. 10 is a flowchart showing a processing procedure for obtaining a quotient and a remainder of Montgomery multiplication in the remainder processing unit 303. Incidentally, the maximum bit number of a message that can be processed by the coprocessor 115 is equal to or more than the bit number of a message to be inputted. In FIG. 10, input and output of messages to the coprocessor 115 are represented by using a function MONTG that receives three messages as an input and outputs one message. Note that a case where the maximum bit length of a message that can be inputted into the coprocessor 115 is equal to or less than the bit number of a message to be inputted will be described with reference to a flowchart shown in FIG. 11.

A case where a message X, a message Y, and a message N are inputted into the remainder processing unit 303 will be first described with reference to FIG. 10. The message X, the message Y, and the message N indicate appropriate messages inputted from the input/output processing unit 302. However, the message N is a message to be modulus of modular multiplication (S701).

The coprocessor handling unit 331 sets the message X, the message Y, and the message N in the coprocessor 115 and it obtains a message R having a value of $XYM^{(-1)} \bmod N$ through Montgomery multiplication executed by the coprocessor 115 (S702).

Next, the coprocessor handling unit 331 modifies a value of the message N which is modulus from N to $(N+2^n)$ to obtain a message R' having a value of $XYM^{(-1)} \bmod (N+2^n)$. For example, the coprocessor handling unit 331 outputs the message N and the constant $2^n$ to the adder 335 and uses the coprocessor 115 to obtain the message R' having a value of $XYM^{(-1)}$mod $(N+2^n)$ from the value outputted by the adder 335. After obtaining the message R', the coprocessor handling unit 331 outputs the message N and the constant $2^n$ to the subtractor 336 and then stores a value outputted from the subtractor 336 as a message N, thereby restoring the value of the message N to its original value (S703).

The coprocessor handling unit outputs the message X, the message Y, the message N, the message R, and the message R' and these messages are inputted into a quotient operating unit 332. The quotient operating unit 332 exchanges the message N, the message R, and the constant $2^2$ with the mod-operating unit 338 and the multiplication unit 339 and stores a calculation result of $RN^{(-1)}$mod $2^2$ in a message T1 (S704).

The quotient operating unit 332 performs exchange of the constant $2^n$, the message N, the message R', and the constant $2^2$ with the adder 335, the mod-operating unit 338, and the multiplication unit 339 and stores a calculation result of $R'(N+2^n)^{(-1)}$mod $2^2$ in a message T2 (S705).

The quotient operating unit 332 performs exchange of the message X, the message Y, the constant $2^2$ with the mod-operating unit 338 and the multiplication unit 339 and stores a calculation result of XYmod $2^2$ in a message T3 (S706).

The quotient operating unit 332 performs exchange of the message T1, the message T2, the message T3, and the constant $2^2$ with the adder 335, the subtractor 336, and the mod-operating unit 338 and stores a calculation result of $(-T1+T2+T3)$mod $2^2$ in the message T (S707).

The quotient operating unit 332 determines whether or not a condition expression (T>2) is satisfied (S708). When the condition is satisfied, the procedure proceeds to step S709. Meanwhile, when the condition is not satisfied, it proceeds to step S710. The quotient operating unit 332 outputs the message T and the constant $2^2$ to the subtractor 336 and stores a value of $(T-2^2)$ in the message T(S709).

The quotient operating unit 332 performs exchange of the message T, the message N, the constant $2^n$, the message R, and the message R' with the adder 335, the subtractor 336, and the multiplication unit 339 and stores a calculation result of $T(N+2^n)+R-R'$ in a message Q (S710).

The quotient operating unit 332 outputs the message R to the remainder operating unit 333. The remainder operating unit 333 outputs the message R to the output unit 334. The quotient operating unit 332 outputs the message Q to the output unit 334. The output unit 334 outputs the message Q and the message R to the input/output processing unit 302 as a quotient Q and a remainder R of Montgomery multiplication (S711).

A flowchart in FIG. 11 exemplifies a processing of the remainder processing unit 303 in the case where the maximum bit number of a message that can be inputted into the coprocessor 115 is limited to n. Incidentally, similar to the case shown in FIG. 10, the input and output of a message to the coprocessor 115 are represented by using the function MONTG in FIG. 11.

The message X, the message Y, and the message N are inputted to the remainder processing unit 303 (S801).

The remainder processing unit 303 outputs the message X and the message Y to the condition-determining unit 337. The condition-determining unit 337 determines whether or not the received message X and message Y satisfy conditional expressions ($0 \leq X, Y < 2^n$). When the conditional expressions are satisfied, the procedure proceeds to step S804. Meanwhile, when they are not satisfied, the procedure proceeds to step S803 (S802).

When the message X satisfies the conditional expression (X<0), the condition-determining unit 337 outputs the message X and the message S to the adder 335. The adder 335 adds a value of the message S to the message X and the condition-determining unit stores the message outputted from the adder 335 in the message X. When the message X satisfies the conditional expression ($X \geq 2^n$), the condition-determining unit 337 outputs the message X and the message S to the subtractor 336 and stores the value outputted from the subtractor 336 in the message X. The condition-determining unit 337 sets an initial value of an integer $x_i$ to 0 and subtracts 1 from $x_i$ for each message exchange with the adder 335 and adds 1 to $x_i$ for each message exchange with the subtractor 336. The condition-determining unit 337 performs processing similar to the processing performed to the message X and the integer $x_i$ to a message Y and an integer $y_j$. Incidentally, the message S is an integer satisfying a conditional expression ($|S| \leq 2^n$), and when $S=2^n$ is set, $x_i$ and $y_j$ where X and Y satisfy the conditional expressions ($0 \leq X, Y < 2^n$) are determined uniquely (S803).

The condition-determining unit 337 outputs the message X, the message Y, the integer $x_i$, and the integer $y_j$ to the coprocessor handling unit 331. The coprocessor handling unit 331 sets the message X, the message Y, and the message N in the coprocessor 115, and it obtains a message R having a value of $XYM^{(-1)}$mod N through Montgomery multiplication executed by the coprocessor 115 (S804).

Next, the coprocessor handling unit 331 performs the processing similar to that in step S804 to obtain a message R' having a calculation result of $XYM^{(-1)}$mod $(N+2^{(n-2)})$ or $XYM^{(-1)}$mod $(N-2^{(n-2)})$. For example, the second bit (which is the (n−2)-th bit from the least significant bit when the least significant bit is the $0^{th}$ bit) from the most significant bit of the message in the coprocessor 115 is reversed, and the message R' is similarly calculated using the coprocessor 115. After the calculation of the remainder, the value of the message N set in the coprocessor 115 is restored to its original value (S805).

The coprocessor handling unit 331 outputs the message N to the condition-determining unit 337. The condition-determining unit 337 determines whether or not the second bit (which is the (n−2)th bit from the least significant bit when the least significant bit is the $0^{th}$ bit) from the most significant bit of the message N is 1. When the condition is satisfied, the processing proceeds to step S808, and when it is not satisfied, it proceeds to step S811 (S807).

The coprocessor handling unit 331 outputs the message X, the message Y, the message N, the message R, and the message R' to the quotient operating unit 332, and the quotient operating unit 332 receives these messages as inputs.

The quotient operating unit 332 performs exchange of the message N, the message R, the message R' the constant $2^2$, and the constant $2^{(n-2)}$ with the subtractor 336, the mod-operating unit 338, and the multiplication unit 339 and then stores a result of $RN^{(-1)}$mod $2^2$ in the message T1 and a result of $R'(N-2^{(n-2)})^{(-1)}$mod $2^2$ in the message T2 (S808).

The quotient operating unit 332 performs exchange of the message T1, the message T2, the constant 4, and the constant $2^4$ with the mod-operating unit 338, the subtractor 336, and the multiplication unit 339 and then stores a result of $4(T1-T2)$mod $2^4$ in the message T (S809).

The quotient operating unit 332 performs exchange of the message X, the message Y, the message N, the constant $2^4$, and the constant $2^{(n-2)}$ with the subtractor 336, the mod-operating unit 338, and the multiplication unit 339 and then stores a result of $XY(N^{(-1)}-(N-2^{(n-2)})^{(-1)})$ mode $2^4$ in the message T (S810).

The quotient operating unit 332 performs exchange of the message N, the message R, the message R', the constant $2^2$, and the constant $2^{(n-2)}$ with the mod-operating unit 338 and the multiplication unit 339 and then stores a result of $RN^{(-1)}$ mod $2^2$ in the message T1 and a result of $R'(N+2^{(n-2)})^{(-1)}$ mod $2^2$ in the message T2 (S811).

The quotient operating unit 332 performs exchange of the message T1, the message T2, the constant 4, and the constant $2^4$ with the subtractor 336, the mod-operating unit 338, and the multiplication unit 339 and then stores a result of $4(T2-T1) \bmod 2^4$ in the message T (S812).

The quotient operating unit 332 performs exchange of the message X, the message Y, the message N, the constant $2^4$, and the constant $2^{(n-2)}$ with the adder 335, the mod-operating unit 338, and the multiplication unit 339 and then stores a result of $XY(N^{(-1)}-(N+2^{(n-2)})^{(-1)}) \bmod 2^4$ in the message T (S813).

The quotient operating unit 332 performs exchange of the message T, the message T3, and the constant $2^4$ with the adder 335 and the mod-operating unit 338 and then stores a result of $(T+T3) \bmod 2^4$ in the message T (S814).

The quotient operating unit 332 determines whether or not the conditional expression $(T>2^3)$ is satisfied (S815). When the condition is satisfied, the processing proceeds to step S816. Meanwhile, when the condition is not satisfied, the processing proceeds to step S817. In step S816, the quotient operating unit 332 outputs the message T and the constant $2^4$ to the subtractor 336 and stores $(T-2^4)$ in the message T (S816).

The quotient operating unit 332 outputs the message N to the condition-determining unit 337. The condition-determining unit 337 determines whether or not the second bit from the most significant bit of the message N is 1. When the condition is satisfied, the processing proceeds to step S818, and when the condition is not satisfied, the processing proceeds to step S819 (S817).

The quotient operating unit 332 performs exchange of messages with the adder 335, the subtractor 336, and the multiplication unit 339 and then stores a result of $T(N-2^{(n-2)})+4(R'-R)$ in the message Q (S818).

The quotient operating unit 332 performs exchange of messages with the adder 335, the subtractor 336, and the multiplication unit 339 and then stores a result of $T(N+2^{(n-2)})+4(R-R')$ in the message Q (S819).

The quotient operating unit 332 outputs the message R, the message X, the message Y, the integer $x_i$, the integer $y_j$, and the message S to the remainder operating unit 333. The remainder operating unit 333 performs exchange of the message R, the message S, the message X, the message Y, the integer $x_i$, and the integer $y_j$ with the adder 335, the subtractor 336, and the multiplication unit 339 and then stores a result of $R+x_iY+y_jX+x_iy_jS$ in the message R (S820).

The remainder operating unit 333 outputs the message R to the output unit 334. The quotient operating unit 332 outputs the message Q to the output unit 334. The output unit 334 outputs the received message Q and message R to the input/output processing unit 302 as a quotient Q and a remainder R of Montgomery multiplication (S821).

<Applications>

When the technique described in the embodiment is used for RSA cryptosystem, it can be applied to all processings that require modular multiplication such as encryption (or signature verification) processing and decryption (or signature generation) processing. Also, the technique can be applied to all processings utilizing modular multiplication such as ElGamal cryptosystem, DSA (digital signature algorithm) cryptosystem, elliptic curve cryptosystem, and pseudo-random number generation.

In this embodiment, the fact that modular multiplication for k ($0<k\leq2$) times the bit length of the coprocessor can be executed has been shown. Furthermore, the bit length multiplied by k ($>2$) times can be handled by utilizing the technique described in this embodiment recursively. As an example, a fundamental mechanism in the case of multiplying the bit length by four times will be described. First, an apparatus that realizes modular multiplication for twice the bit length of the coprocessor 115 is realized by applying this embodiment to the apparatus. Next, the apparatus is utilized as the coprocessor 115. The number of bits of the data to be processed becomes double in respective processings in the other data processing unit 113 and Montgomery multiplication utilizing unit 116. Then, the modular multiplication for four times the bit length of the coprocessor can be processed in accordance with the processing shown in the sequence diagram in FIG. 2 of this embodiment.

This embodiment is directed to the case where the coprocessor 115 is implemented as hardware, but the technique of this embodiment can be similarly applied to the case where the coprocessor 115 is implemented as software.

<Ingenuity on Implementation>

In the technique according to this embodiment, a quotient of Montgomery multiplication defined by Equation 2 is calculated in the process for multiplying the bit length by k ($0<k$) times. However, when a value of a message to be modulus is small, an absolute value of a quotient of Montgomery multiplication may become excessively large. When the absolute value becomes excessively large, such problems as overflow and increase in calculation amount may occur. Therefore, it is desirable to set a relatively large value as modulus.

Figure 12:
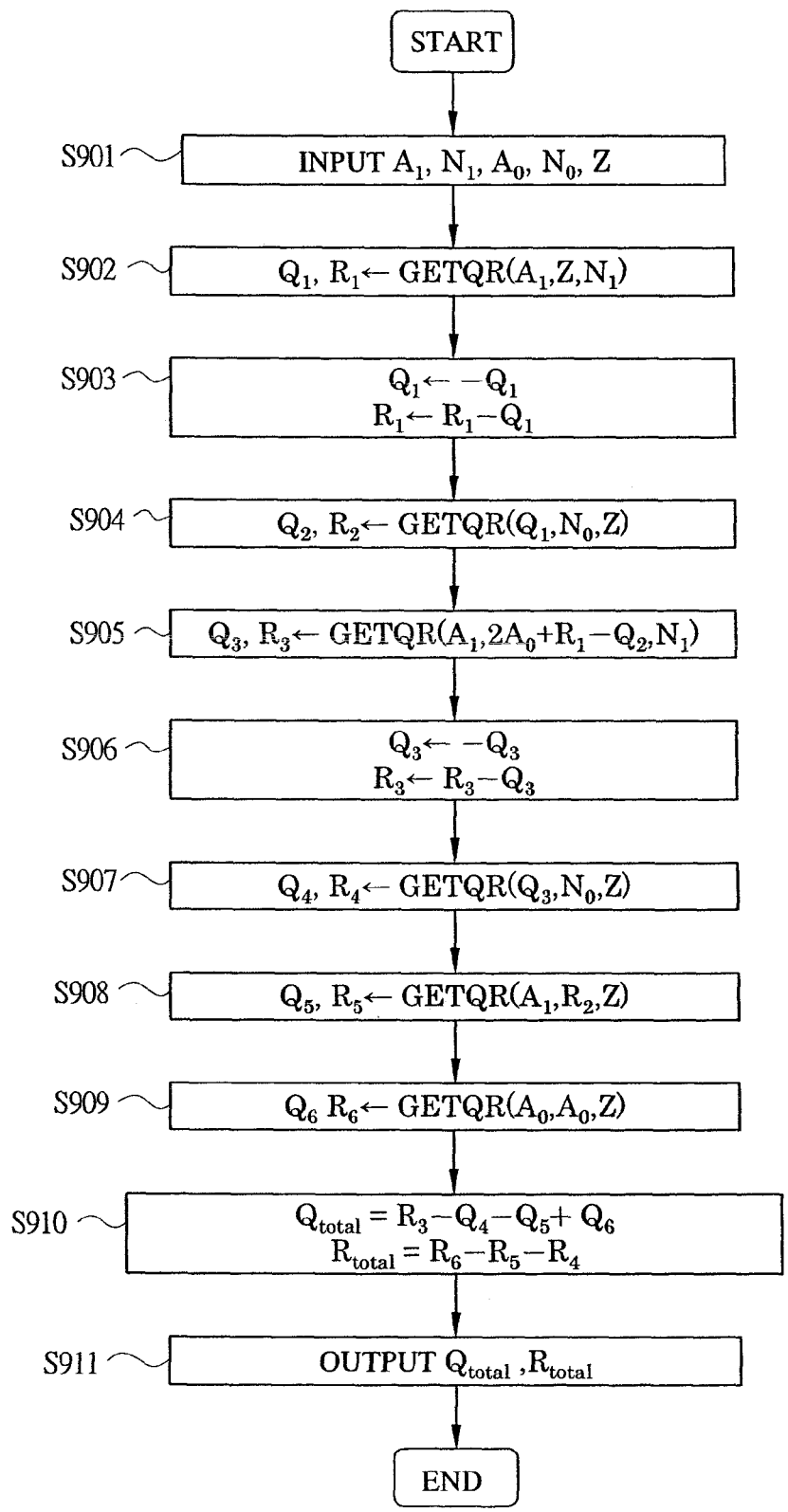
FIG. 12 exemplifies an input and output processing flow with the remainder processing unit when a value of a message $N_1$ has been changed, performed by the input/output processing unit in the computer to which the first embodiment of the present invention has been applied.
Figure 13:
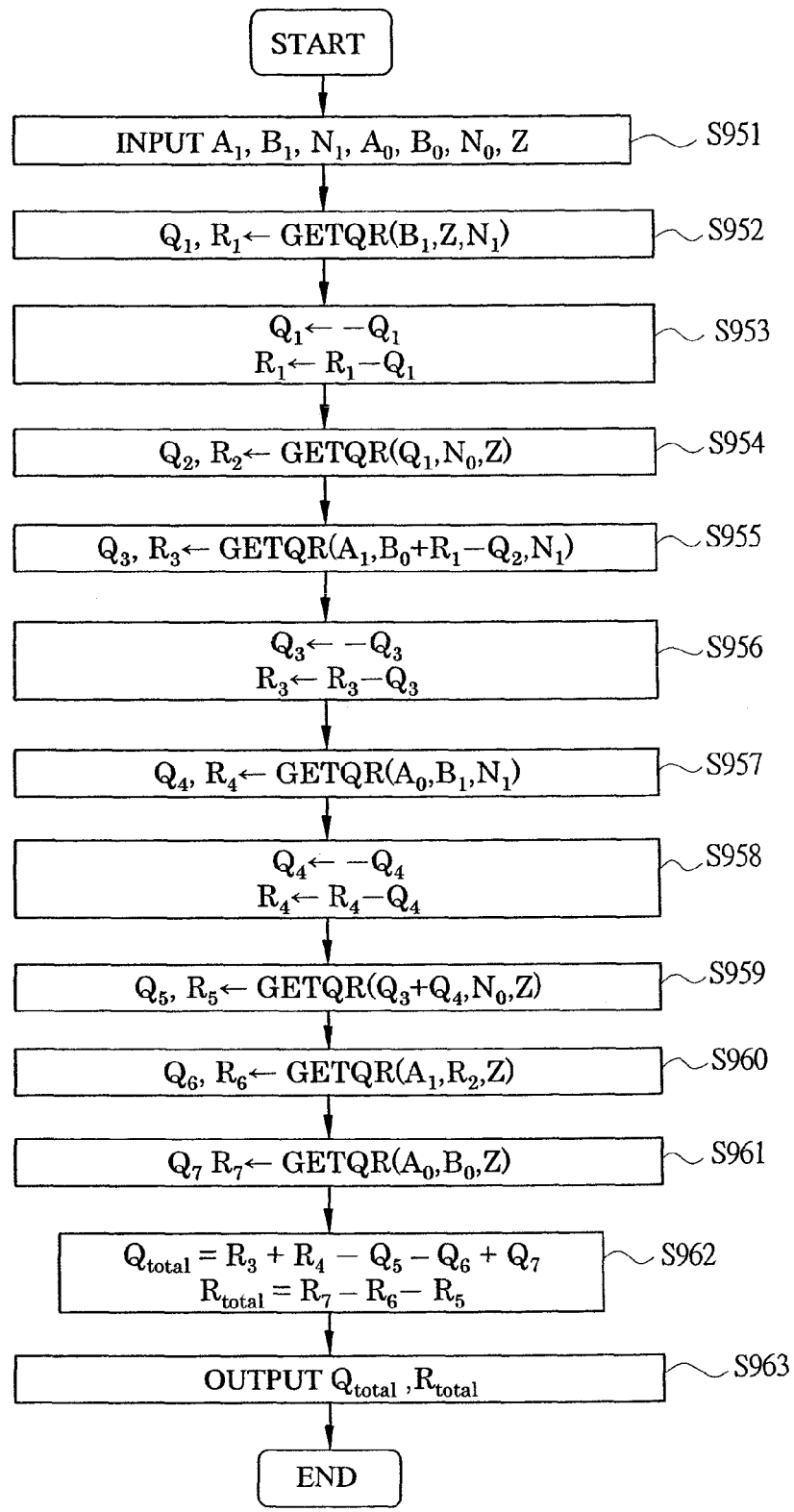
FIG. 13 exemplifies an input and output processing flow with the remainder processing unit when a value of a message $N_1$ has been changed, performed by the input/output processing unit in the computer to which the first embodiment of the present invention has been applied.

For its achievement, a method for correcting a value of modulus so that the modulus has a certain fixed value will be described with reference to FIG. 5, FIG. 12, and FIG. 13. FIG. 12 and FIG. 13 are flowcharts showing an input and output processing with the remainder processing unit 303 performed when the input/output processing unit 302 in the computer in the computer system to which the modular multiplication processing apparatus according to the first embodiment of the present invention has been applied has changed a value of a message $N_1$.

In step S503 shown in FIG. 5, after the message $N_1$ to be modulus for Montgomery multiplication has been calculated, the message $N_1$ can be changed by inserting the processing in steps S504 to S506 shown below.

The expression transforming unit 311 determines whether or not the message $N_1$ satisfies a conditional expression $(N_1 \geq 2^{(n-1)})$ (S504). When the condition is satisfied, the processing proceeds to step S510. When the condition is not satisfied, the expression transforming unit 311 outputs the constant $2^n$ and the message $N_1$ to subtractor 316 (S505). The subtractor 316 subtracts the message $N_1$ from the constant $2^n$ and then outputs a message having a value of $(2^n-N_1)$. The expression transforming unit 311 stores the received message in the message $N_1$ (S506), and the processing proceeds to step S510.

The message N1 always satisfies the conditional expression $(N_1 \geq 2^{(n-1)})$ owing to the insertion of the above-described processing from the steps S504 to S506, and a value with a fixed size can be set as modulus.

When the processings in the steps S504 to S506 are inserted in the processing in the expression processing unit 301, it is necessary to insert some processings in the processing performed by the input/output processing unit 302.

FIG. 12 and FIG. 13 are flowcharts showing a processing procedure in the input setting unit 321 in the input/output processing unit 302.

FIG. 12 exemplifies a case where Montgomery multiplication of squaring of the message A when the message $N_1$ has been changed is calculated, and FIG. 13 exemplifies a case where Montgomery multiplication to the message A and the message B when the message $N_1$ has been changed is calculated. FIG. 12 exemplifies a case where processings in step S903 and step S906 are added to the procedure in FIG. 8, and FIG. 13 exemplifies a case where processings in step S953, step S956, and step S958 are added to the procedure in FIG. 9. Only the added processings will be described.

In step S903, the input setting unit 321 outputs the constant 0 and the message $Q_1$ to the subtractor 316. The subtractor 316 subtracts the message $Q_1$ from the constant 0 and then outputs the obtained value as a message. The input setting unit 321 stores the outputted value in the message $Q_1$. Further, the input setting unit 321 outputs the message $R_1$ and the message $Q_1$ to the subtractor 316. The subtractor 316 subtracts the message $Q_1$ from the message $R_1$ and then outputs the obtained value as a message. The input setting unit 321 stores the outputted value in the message $R_1$ (S903).

In step S906, the input setting unit 321 outputs the constant 0 and the message $Q_3$ to the subtractor 316. The subtractor 316 subtracts the message $Q_3$ from the constant 0 and then outputs the obtained value as a message. The input setting unit 321 stores the outputted value in the message $Q_3$. Further, the input setting unit 321 outputs the message $R_3$ and the message $Q_3$ to the subtractor 316. The subtractor 316 subtracts the message $Q_3$ from the message $R_3$ and then outputs the obtained value as a message. The input setting unit 321 stores the outputted value in the message $R_3$ (S906).

A processing in step S953 is similar to that in step S903 (S953).

A processing in step S956 is similar to that in step S906 (S956).

In step S958, the input setting unit 321 outputs the constant 0 and the message $Q_4$ to the subtractor 316. The subtractor 316 subtracts the message $Q_4$ from the constant 0 and then outputs the obtained value as a message. The input setting unit 321 stores the outputted value in the message $Q_4$. Further, the input setting unit 321 outputs the message $R_4$ and the message $Q_4$ to the subtractor 316. The subtractor 316 subtracts the message $Q_4$ from the message $R_4$ and then outputs the obtained value as a message. The input setting unit 321 stores the outputted value in the message $R_4$ (S958).

<Correction of Quotient and Remainder of Montgomery Multiplication>

In a sequence diagram shown in FIG. 2, modular exponentiation of a message can be performed by repeating a series of processings, in which the Montgomery multiplication utilizing unit 116 and the coprocessor 115 are involved, from the reception of a message in the Montgomery multiplication utilizing unit 116 in step S202 to the output of a message from the Montgomery multiplication utilizing unit 116 in step S205. However, when the modular exponentiation of a message is performed repeatedly, a size of a message to be handled gradually becomes large, which causes problems such as overflow and increase in calculation amount in some cases.

A method for transforming a quotient Q and a remainder R of Montgomery multiplication so that the Montgomery multiplication utilizing unit 116 satisfies the conditional expressions (−S<Q, R<S) will be described with reference to FIG. 14. FIG. 14 is a flowchart showing a processing for transforming a quotient and a remainder of Montgomery multiplication executed by the input/output processing unit in the computer in the communication system to which the modular multiplication processing apparatus according to the first embodiment of the present invention has been applied.

Figure 14:
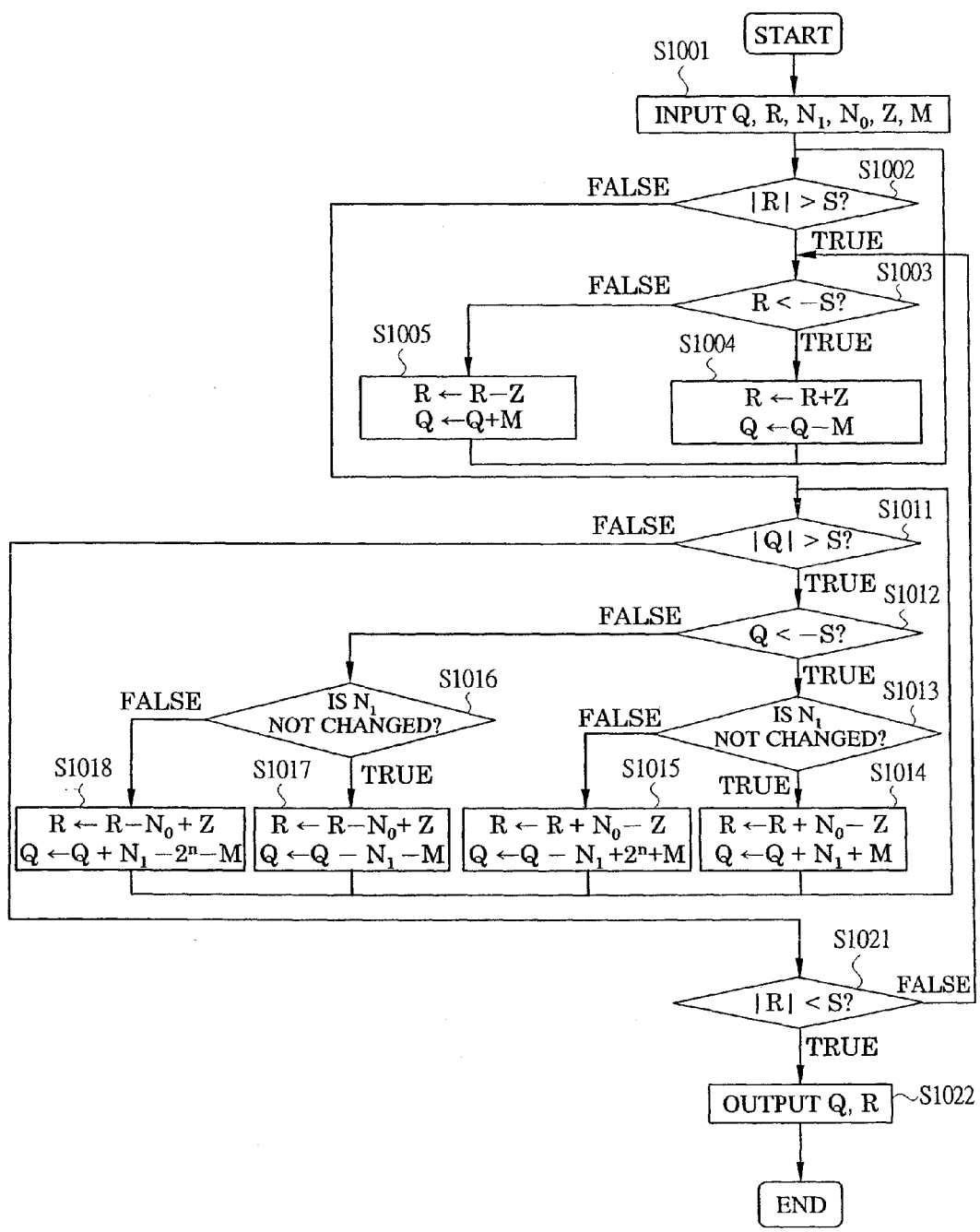
FIG. 14 exemplifies a processing flow for transforming a quotient and a remainder of Montgomery multiplication performed by the input/output processing unit in the computer to which the first embodiment of the present invention has been applied.

Incidentally, the processing shown in FIG. 14 is handled by a correcting unit 323 in the input/output processing unit 302 of the function blocks in the Montgomery multiplication utilizing unit 116 shown in FIG. 3.

In FIG. 14, a quotient Q and a remainder R of Montgomery multiplication, the message $N_1$, the message $N_0$, the message Z, and the Montgomery constant M are inputted to the correcting unit 323 in the Montgomery multiplication utilizing unit 116 (S1001).

The correcting unit 323 determines whether or not the absolute value of R exceeds S as a condition (whether or not |R|>S is satisfied). When the condition is satisfied, the processing in the correcting unit 323 proceeds to step S1003, and when the condition is not satisfied, the processing in the correcting unit 323 proceeds to step S1011 (S1002).

The correcting unit 323 determines whether or not the condition (R<−S) is satisfied. When the condition is satisfied, the processing in the correcting unit 323 proceeds to step S1004, and when the condition is not satisfied, the processing proceeds to step S1005 (S1003).

The correcting unit 323 outputs a remainder R of Montgomery multiplication and the message Z to the adder 325 and then stores a value of (R+Z) outputted from the adder 325 in the remainder R of Montgomery multiplication. Also, the correcting unit 323 outputs a quotient Q of Montgomery multiplication and the Montgomery constant M to the subtractor 326 and then stores a value of (Q−M) outputted from the subtractor 326 in the quotient Q of Montgomery multiplication (S1004).

The correcting unit 323 outputs a remainder R of Montgomery multiplication and the message Z to the subtractor 326 and then stores a value of (R−Z) outputted from the subtractor 326 in the remainder R of Montgomery multiplication. Also, the correcting unit 323 outputs a quotient Q of Montgomery multiplication and Montgomery constant M to the adder 325 and then stores a value of (Q+M) outputted from the adder 325 in the quotient Q of Montgomery multiplication (S1005).

The correcting unit 323 determines whether or not the absolute value of Q exceeds S as a condition (whether or not |Q|>S is satisfied) (S1101). When the condition is satisfied, the processing proceeds to step S1012, and when the condition is not satisfied, the processing proceeds to step S1021. In step S1012, the correcting unit 323 determines whether or not the conditional expression (Q<−S) is satisfied. When the condition is satisfied, the processing proceeds to step S1013, and when the condition is not satisfied, the processing proceeds to step S1016.

In the above-described ingenuity on implementation, the fact that a value of $N_1$ is changed and is made larger than a fixed value ($N_1 \geq 2^{(n-1)}$) by inserting the processings from step S504 to step S506 between step S503 and step S510 has been shown. In step S1013, when the value of $N_1$ is not changed even when these processings are inserted, the processing proceeds to step S1014, and when the value is changed, the processing proceeds to step S1015 (S1013).

The correcting unit 323 performs exchange of a remainder R of Montgomery multiplication, the message $N_0$, and the message Z with the adder 325 and the subtractor 326 and then stores a value of (R+$N_0$−Z) in the remainder R of Montgomery multiplication. The correcting unit 323 exchanges a quotient Q of Montgomery multiplication, the message $N_1$, and the message M with the adder 325 and then stores a value of (Q+$N_1$+M) in the quotient Q of Montgomery multiplication (S1014).

The correcting unit 323 exchanges a remainder R of Montgomery multiplication, the message $N_0$, and the message Z with the adder 325 and the subtractor 326 and then stores a value of $(R+N_0-Z)$ in the remainder R of Montgomery multiplication. The correcting unit 323 exchanges a quotient Q of Montgomery multiplication, the message $N_1$, the constant $2^n$, and the message M with the adder 325 and the subtractor 326 and then stores a value of $(Q-N_1+2^n+M)$ in the quotient Q of Montgomery multiplication (S1015).

In step S1016, the correcting unit 323 performs condition determination similar to that in step S1013. When the value of $N_1$ has not been changed, the processing proceeds to step S1017, and when the value has been changed, the processing proceeds to step S1018 (S1016).

The correcting unit 323 exchanges a remainder R of Montgomery multiplication, the message $N_0$, and the message Z with the adder 325 and the subtractor 326 and then stores a value of $(R-N_0+Z)$ in the remainder R of Montgomery multiplication. The correcting unit 323 exchanges a quotient Q of Montgomery multiplication, the message $N_1$, and the message M with the subtractor 326 and then stores a value of $(Q-N_1-M)$ in the quotient Q of Montgomery multiplication (S1017).

The correcting unit 323 exchanges a remainder R of Montgomery multiplication, the message $N_0$, and the message Z with the adder 325 and the subtractor 326 and then stores a value of $(R-N_0+Z)$ in the remainder R of Montgomery multiplication. The correcting unit 323 exchanges a quotient Q of Montgomery multiplication, the message $N_1$, the constant $2^n$, and the message M with the adder 325 and the subtractor 326 and then stores a value of $(Q+N_1-2^n-M)$ in the quotient Q of Montgomery multiplication (S1018).

The correcting unit 323 determines whether or not the condition ($|R|<S$) is satisfied in step S1021. When the condition is not satisfied, the processing proceeds to step S1003, and when the condition is satisfied, the processing proceeds to step S1022.

The correcting unit 323 outputs a quotient Q and a remainder R of Montgomery multiplication to the output unit 324 in step S1022. The output unit 324 outputs the quotient Q and the remainder R of Montgomery multiplication (S1022).
<Correction of $A_1$ and $A_0$>

Figure 15:
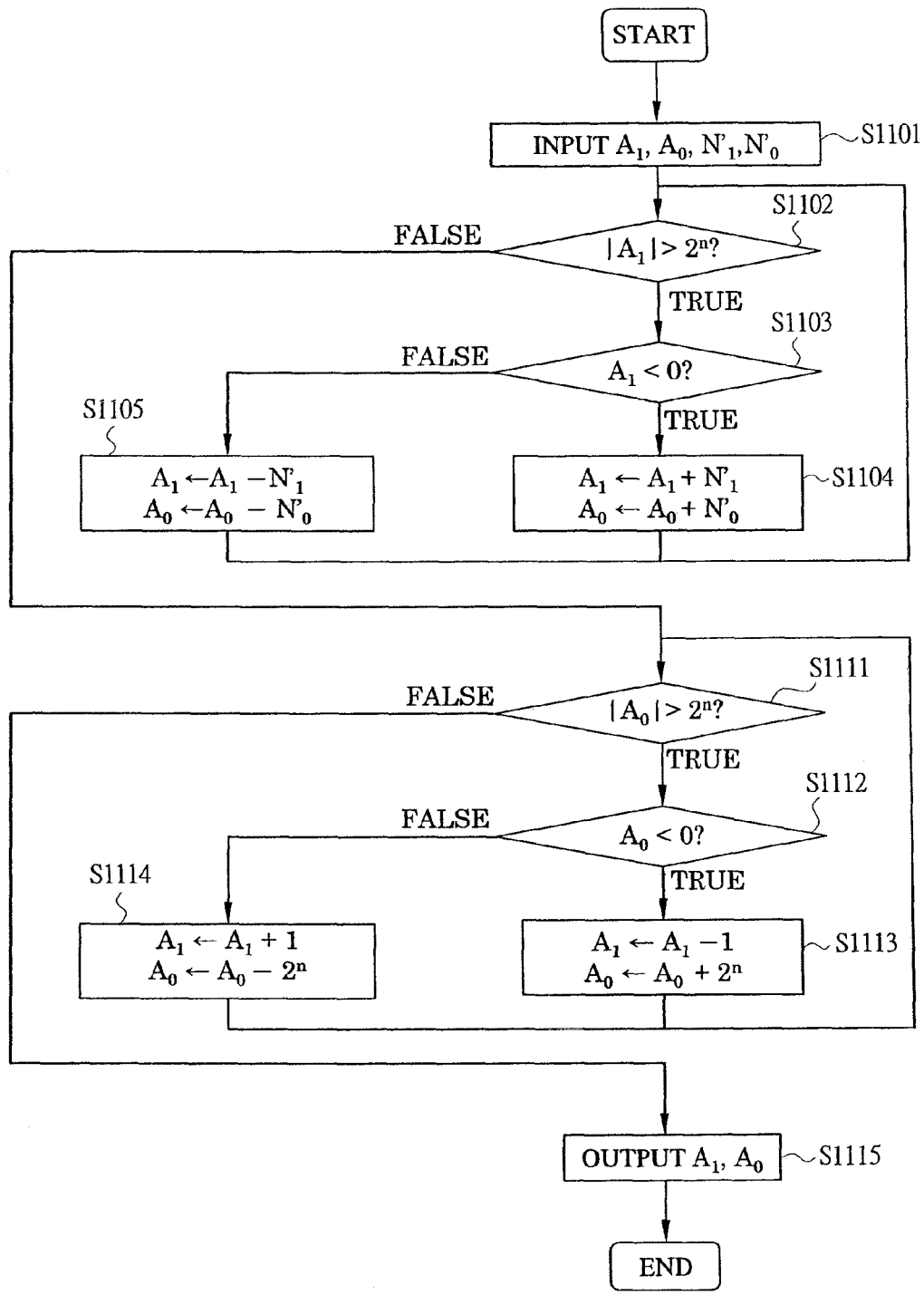
FIG. 15 exemplifies a processing flow for transforming a quotient and a remainder of Montgomery multiplication performed by the input/output processing unit in the computer to which the first embodiment of the present invention has been applied.

A method that the expression processing unit 301 transforms the message $A_1$ and the message $A_0$ so that the message outputted in step S205 in the sequence diagram shown in FIG. 2 has a value smaller than a value of a message set as modulus will be described with reference to FIG. 15. Incidentally, this processing is handled by the correcting unit 313 in the expression processing unit 301 of function blocks in the Montgomery multiplication utilizing unit 116 shown in FIG. 3. FIG. 15 is a flowchart showing a processing for transforming a quotient and a remainder of Montgomery multiplication performed by an input/output processing unit in the computer in the communication system to which the modular multiplication processing apparatus according to the first embodiment of the present invention has been applied. This processing can be inserted between step S552 and step S553 shown in FIG. 6.

First, the correcting unit 313 receives a message $A_1$, a message $A_0$, a message $N'_1$, and a message $N'_0$ as inputs (S1101). The correcting unit 313 determines whether or not the conditional expression ($|A_1|>2^n$) is satisfied (S1102). When the condition is satisfied, the processing proceeds to step S1103, and when the condition is not satisfied, the processing proceeds to step S1111. The correcting unit 313 determines whether or not the condition expression ($A_1<0$) is satisfied (S1103). When the condition is satisfied, the processing proceeds to step S1104, and when the condition is not satisfied, the processing proceeds to step S1105.

The correcting unit 313 outputs the message $A_1$ and the message $N'_1$ to the adder 315 and then stores a value of $(A_1+N'_1)$ in the message $A_1$. The correcting unit 313 outputs the message $A_0$ and the message $N'_0$ to the adder 315 and then stores a value of $(A_0+N'_0)$ in the message $A_0$ (S1104).

The correcting unit 313 outputs the message $A_1$ and the message $N'_1$ to the subtractor 316 and then stores a value of $(A_1-N'_1)$ in the message $A_1$. The correcting unit 313 outputs the message $A_0$ and the message $N'_0$ to the subtractor 316 and then stores a value of $(A_0-N'_0)$ in the message $A_0$ (S1105).

The correcting unit 313 determines whether or not the conditional expression ($|A_0|>2^n$) is satisfied (S1111). When the conditional expression is satisfied, the processing proceeds to step S1112, and when the conditional expression is not satisfied, the processing proceeds to step S1115. The correcting unit 313 determines whether or not the conditional expression ($A_0<0$) is satisfied (S1112). When the conditional expression is satisfied, the processing proceeds to step S1113, and when the conditional expression is satisfied, the processing proceeds to step S1114.

The correcting unit 313 outputs the message $A_1$ and the constant 1 to the subtractor 316 and then stores a value of $(A_1-1)$ in the message $A_1$. The correcting unit 313 outputs the message $A_0$ and the constant $2^n$ to the adder 315 and then stores a value of $(A_0+2^n)$ in the message $A_0$ (S1113).

The correcting unit 313 outputs the message $A_1$ and the constant 1 to the adder 315 and then stores a value of $(A_1+1)$ in the message $A_1$. The correcting unit 313 outputs the message $A_0$ and the constant $2^n$ to the subtractor 316 and then stores a value of $(A_0-2^n)$ in the message $A_0$ (S1114).

The correcting unit 313 outputs the message $A_1$ and the message $A_0$ (S1115).

As described above, it is possible to process modular multiplication of data exceeding a bit length that can be processed by the coprocessor by using a coprocessor based upon Montgomery multiplication in this embodiment.

(Second Embodiment)

In a second embodiment, a method and an apparatus for amplifying a bit length of modular multiplication based upon Montgomery multiplication using binary field will be described. A difference between the first embodiment and the second embodiment lies in that a set where four arithmetic operations of addition, subtraction, multiplication, and division are defined is changed from finite field to binary field.
<Function Blocks in Montgomery Multiplication Utilizing Unit>

In the second embodiment, description about portions common to those in the first embodiments is omitted, and a processing in a Montgomery multiplication utilizing unit 116 in the computer A101 will be described.

The Montgomery multiplication utilizing unit 116 has a function to obtain a remainder of a 2n-bit message or a remainder of modular exponentiation by using Montgomery multiplication similar to that of the first embodiment. In this embodiment, function blocks of the subtractor 316, the subtractor 326, and the subtractor 336 in the function blocks in Montgomery multiplication utilizing unit 116 shown in FIG. 3 are not used.

Accordingly, the first processing unit is composed of the coprocessor handling unit 331, the quotient operating unit 332, the remainder operating unit 333, the adder 335, the condition-determining unit 337, the mod-operating unit 338, and the multiplication unit 339 in the remainder processing unit 303.

Also, the second processing unit is composed of the input setting unit 321, the synthesizing unit 322, and the adder 325 in the input/output processing unit 302, the fifth processing unit is composed of the repetition-determining unit 327 and the condition-determining unit 328 in the input/output processing unit 302, and the sixth processing unit is composed of the correcting unit 323 and the adder 325 in the input/output processing unit 302.

Further, the third processing unit is composed of the expression transforming unit 311 and the adder 315 in the expression processing unit 301, and the fourth processing unit is composed of the inverse-transforming unit 312, the adder 315, and the synthesizing unit 317 in the expression processing unit 301.

<Processing in Expression Processing Unit>

Figure 16:
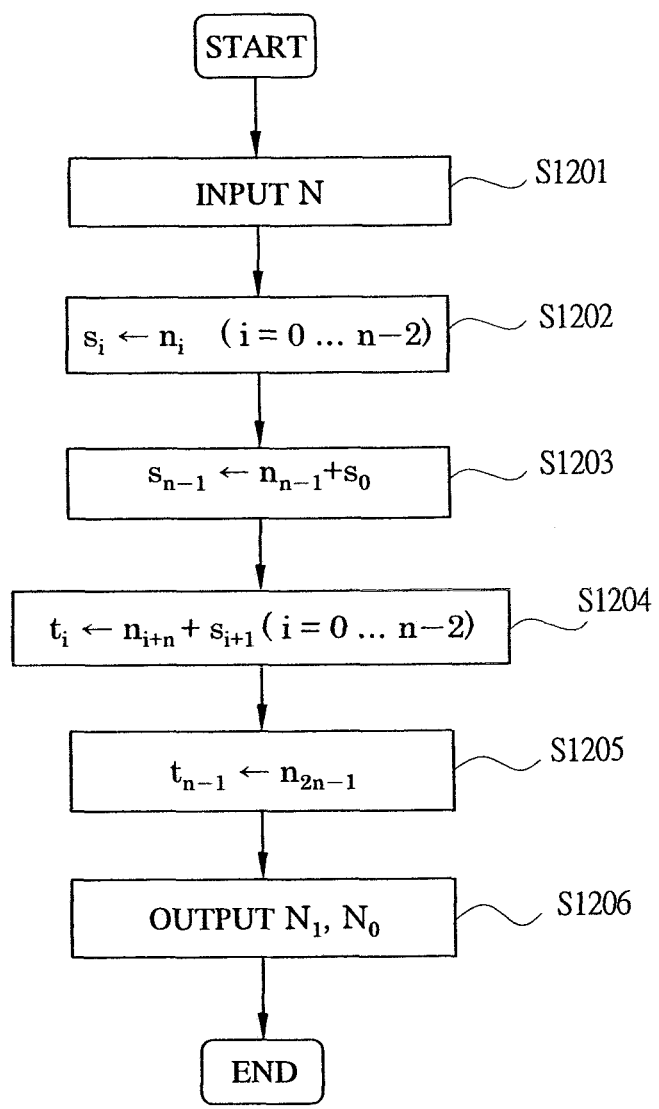
FIG. 16 exemplifies a transforming processing flow of integer expression performed by an expression processing unit in the computer to which a second embodiment of the present invention has been applied.
Figure 17:
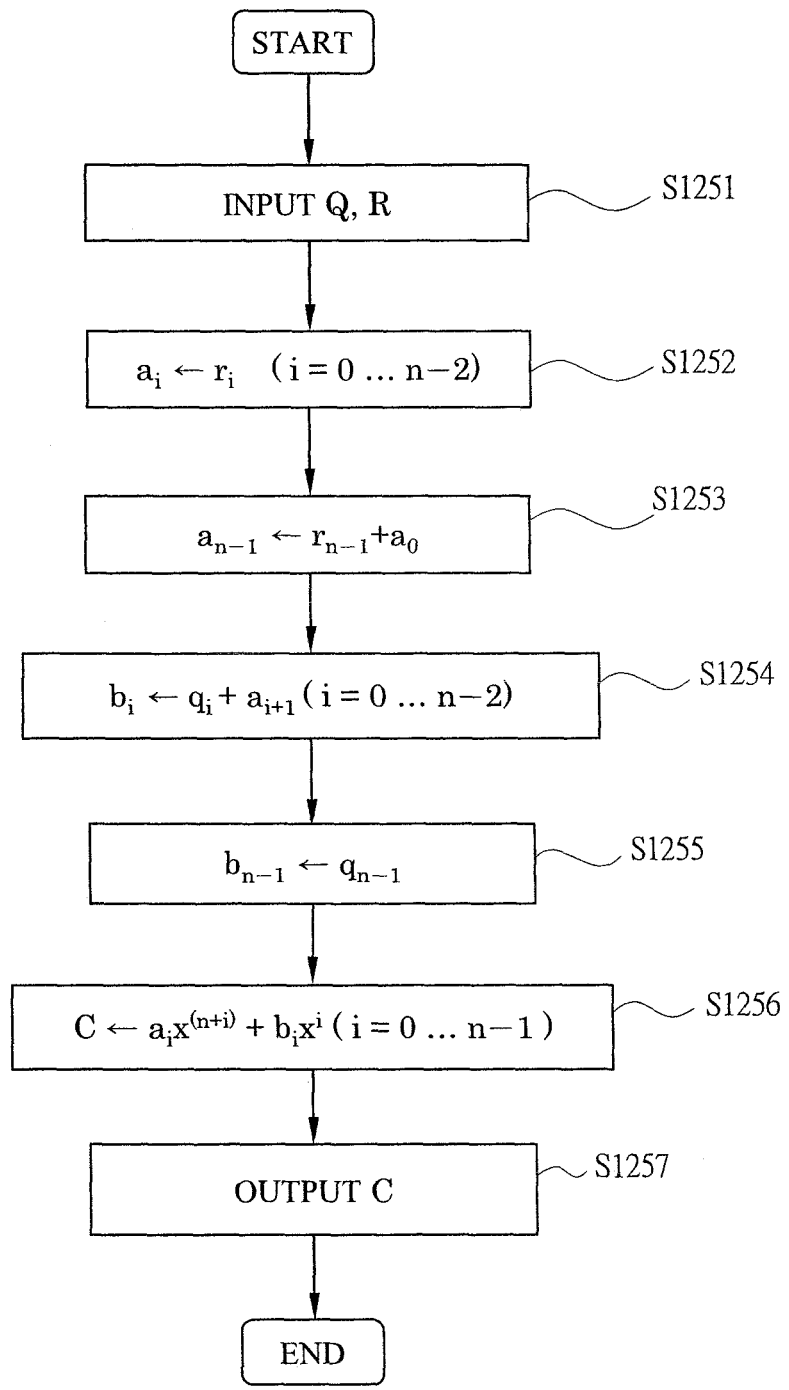
FIG. 17 exemplifies a transforming processing flow of integer expression performed by an expression processing unit in the computer to which the second embodiment of the present invention has been applied.

A transforming processing of integer expression that is performed by the expression processing unit in the computer in the communication system to which the modular multiplication processing apparatus according to the second embodiment of the present invention has been applied will be described with reference to FIG. 16 and FIG. 17. FIG. 16 and FIG. 17 are flowcharts showing transforming processings of integer expression that is performed by the expression processing unit in the computer in the communication system to which the modular multiplication processing apparatus according to the second embodiment of the present invention has been applied.

The expression processing unit 301 has a function to transform a message to a message for Montgomery multiplication or perform inverse transformation from a message for Montgomery multiplication to its original message to output the same.

The following equation is satisfied among a 2n-bit message N, an n-bit message for Montgomery multiplication $N_1$, and an n-bit message for Montgomery multiplication $N_0$.

$$N = N_1 Z + N_0 M \qquad \text{Equation 3}$$

Here, M represents Montgomery constant set in the coprocessor 115, and Z represents any one of at most n-dimensional polynomial expression. $N_1$ to be set in the coprocessor 115 as modulus can be changed by changing Z. For example, a value of Z can be set so that the least significant bit of $N_1$ always becomes 1, $N_1$ becomes an irreducible polynomial expression, or $N_1$ and $N_0$ become at most (n−1)-dimension.

As an example, a procedure for obtaining $N_1$ and $N_0$ in the case of $Z = x^{(n-1)} + 1$ where a value of a Montgomery constant M is $x^n$ will be described with reference to a flowchart shown in FIG. 16. The flowchart in FIG. 16 exemplifies a processing procedure performed until the expression transforming unit 311 produces messages $N_1$ and $N_0$ for Montgomery multiplication from at most (2n−1)-dimensional message N.

A message N composed of 2n-bit polynomial expression is inputted to the expression transforming unit 311 (S1201). Here, the message N is a (2n−1)-dimensional polynomial expression expressed by the following equation.

$$N = n_{2n-1} x^{2n-1} + n_{2n-2} x^{2n-2} + \ldots + n_1 x + n_0$$

At this time, a message $N_1$ and a message $N_0$ composed of the following (n−1)-dimensional polynomial expression are obtained.

$$N_1 = s_{n-1} x^{n-1} + s_{n-2} x^{n-2} + \ldots + s_1 x + s_0$$

$$N_0 = t_{n-1} x^{n-1} + t_{n-2} x^{n-2} + \ldots + t_1 x + t_0$$

The expression transforming unit 311 stores values of $n_0$ to $n_{n-2}$ in $s_0$ to $s_{n-2}$, respectively (S1202).

The expression transforming unit 311 outputs $s_0$ and $n_{n-1}$ to the adder 325 and then stores a result of addition of $s_0$ and $n_{n-1}$ by the adder 325 in $s_{n-1}$ (S1203).

The expression transforming unit 311 outputs values of $n_n$ to $n_{2n-2}$ to the adder 325 and outputs values of $s_1$ to $s_{n-1}$ to the adder 325, respectively, and then stores the results of the additions in $t_1$ to $t_{n-2}$ (S1204).

The expression transforming unit 311 stores a value of $n_{2n-1}$ in $t_{n-1}$ (S1205).

The expression transforming unit 311 outputs the message $N_1$ and the message $N_0$ to the output unit 314. The output unit 314 outputs the received message $N_1$ and message $N_0$ (S1206).

The expression transforming unit 311 produces messages for Montgomery multiplication $A_1$ and $A_0$ from the message A and messages for Montgomery multiplication $B_1$ and $B_0$ from the message B through the similar procedure, and the output unit 314 outputs the messages for Montgomery multiplication $A_1$, $A_0$, $B_1$ and $B_0$.

In FIG. 16, the procedure where the value of Montgomery constant M is $x^n$ and Z is $x^{(n-1)} + 1$ has been shown. However, even when other polynomial expressions are set to M and Z, messages for Montgomery multiplication can be produced through a similar procedure.

A flowchart shown in FIG. 17 exemplifies a processing procedure from the production of an 2n-bit message C from a quotient Q and a remainder R of Montgomery multiplication to the output of the message C when the value of Montgomery constant M is $x^n$ and Z is $x^{(n-1)} + 1$.

A quotient Q and a remainder R of Montgomery multiplication are inputted to the reverse-transforming unit 312 (S1251). Here, the quotient Q and the remainder R of Montgomery multiplication are (n−1)-dimensional polynomial expressions composed of the following equations.

$$Q = q_{n-1} x^{n-1} + q_{n-2} x^{n-2} + \ldots + q_1 x + q_0$$

$$R = r_{n-1} x^{n-1} + r_{n-2} x^{n-2} + \ldots + r_1 x + r_0$$

First, a message $A_1$ and a message $A_0$ composed of the following (n−1)-dimensional polynomial expressions are obtained.

$$A_1 = a_{n-1} x^{n-1} + a_{n-2} x^{n-2} + \ldots + a_1 x + a_0$$

$$A_0 = b_{n-1} x^{n-1} + b_{n-2} x^{n-2} + \ldots + b_1 x + b_0$$

The reverse-transforming unit 312 stores values of $r_0$ to $r_{n-2}$ in $a_0$ to $a_{n-2}$, respectively (S1252).

The inverse-transforming unit 312 outputs $a_0$ and $r_{n-1}$ to the adder 315 and then stores a result of addition of $a_0$ and $r_{n-1}$ by the adder 315 in $a_{n-1}$ (S1253).

The reverse-transforming unit 312 outputs values of $q_0$ to $q_{n-2}$ and $a_1$ to $a_{n-1}$ to the adder 315, respectively, and then stores results of additions in $b_1$ to $b_{n-2}$ (S1254).

The inverse-transforming unit 312 stores a value of $q_{n-1}$ in $b_{n-1}$ (S1255).

The inverse-transforming unit 312 outputs the message $A_1$ and the message $A_0$ to the synthesizing unit 317. The synthesizing unit 317 produces a message C satisfying the following equation (S1256).

$$C = \sum_{i=0}^{(n-1)} a_i x^{(i+n)} + \sum_{i=0}^{(n-1)} b_i x^i$$

The synthesizing unit 317 outputs the message C to the inverse-transforming unit 312. The inverse-transforming unit 312 outputs the received message C to the output unit 314. The output unit 314 outputs the message C (S1257).

<Processing in Input/Output Processing Unit>

Figure 18:
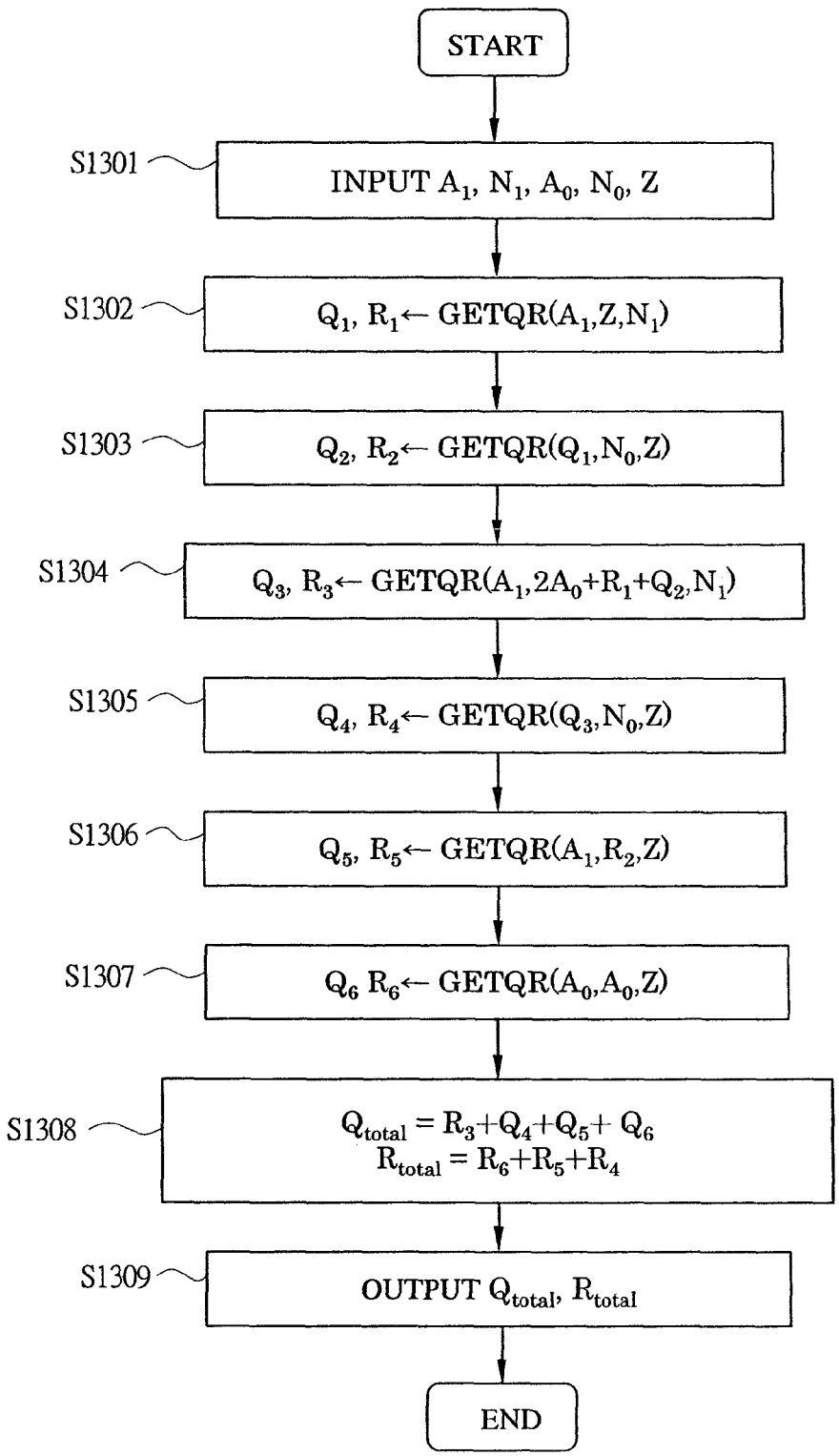
FIG. 18 exemplifies an input and output processing flow with a remainder processing unit performed by an input/output processing unit in the computer to which the second embodiment of the present invention has been applied.
Figure 19:
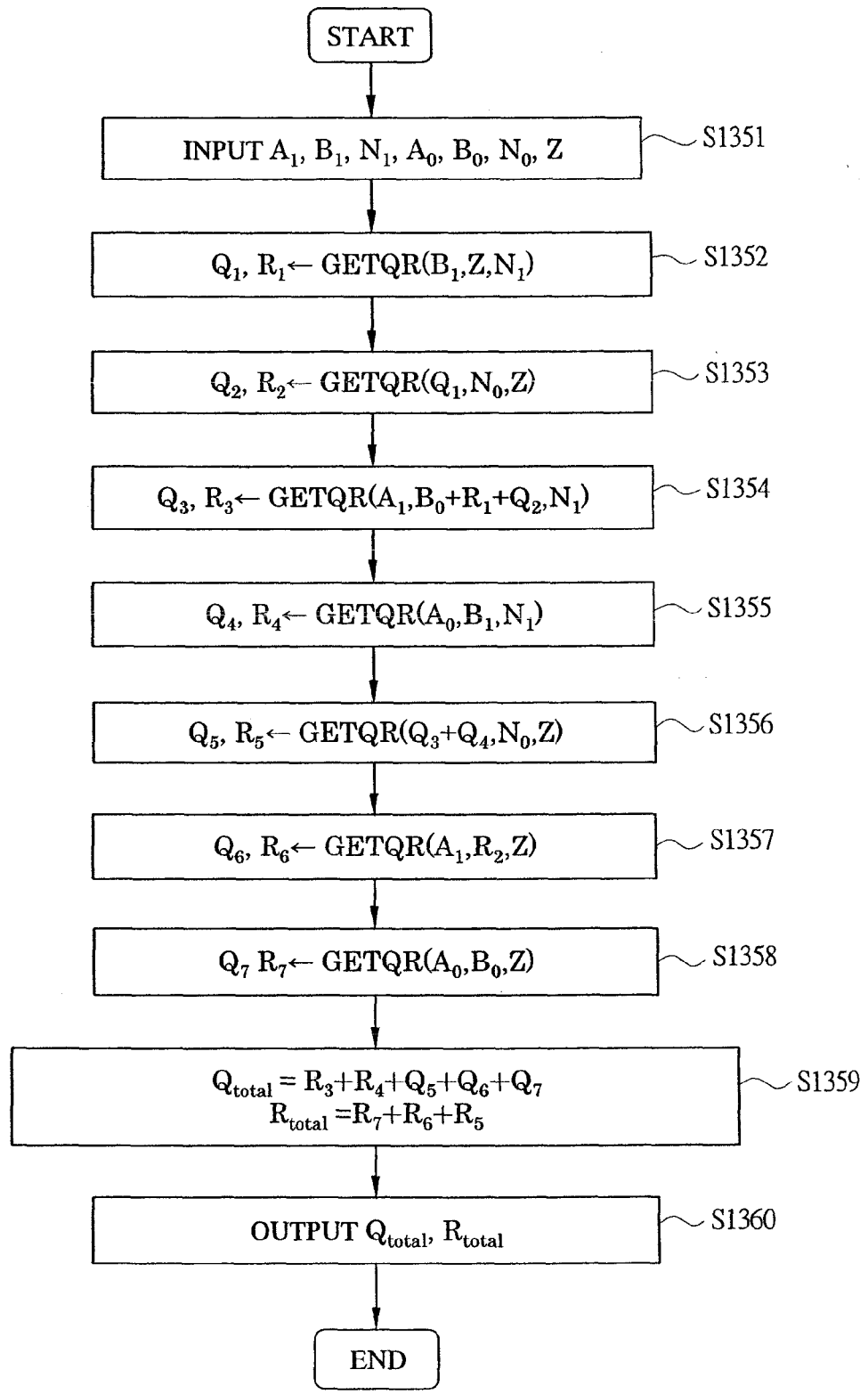
FIG. 19 exemplifies an input and output processing flow with a remainder processing unit performed by an input/output processing unit in the computer to which the second embodiment of the present invention has been applied.

An input and output processing with the remainder processing unit performed by the input/output processing unit in the computer in the communication system to which the modular multiplication processing apparatus according to the second embodiment of the present invention has been applied will be described with reference to FIG. 18 and FIG. 19. FIG. 18 and FIG. 19 are flowcharts showing an input and output processing with the remainder processing unit performed by the input/output processing unit in the computer in the communication system to which the modular multiplication processing apparatus according to the second embodiment of the present invention has been applied.

The input/output processing unit 302 has a function to output a message for Montgomery multiplication inputted into the remainder processing unit 303, and it has a function to receive a message outputted from the remainder processing unit 303 as an input and calculate a remainder of modular multiplication based upon at most (2n−1)-dimensional Montgomery multiplication to output the same.

A processing procedure regarding modular exponentiation in the input/output processing unit 302 is approximately similar to that shown in FIG. 7 in the first embodiment. A difference therebetween lies in that the processing for modular multiplication of $A^2$ in step S574 is replaced with a processing procedure from step S1301 to step S1309 described in a flowchart shown in FIG. 18 and the processing for modular multiplication of A×B in step S577 is replaced with a processing procedure from step S1351 to step S1360 described in a flowchart shown in FIG. 19.

In FIG. 18 and FIG. 19, input and output of messages to and from the remainder processing unit 303 are expressed as a function GETQR which receives three messages as inputs and outputs two messages.

FIG. 18 is a flowchart showing a processing in the input setting unit 321 when Montgomery multiplication of squaring of message A having a message N as modulus is calculated. A processing procedure where the input setting unit 321 outputs a message to the remainder processing unit 303 and calculates a remainder of 2n-bit Montgomery multiplication by using a quotient and a remainder of Montgomery multiplication outputted from the remainder processing unit 303 will be described.

First, a message $A_1$, a message $N_1$, a message $A_0$, a message $N_0$, and a message Z are inputted to the input setting unit 321 (S1301).

The input setting unit 321 outputs the message $A_1$, the message Z, and the message $N_1$ to the Montgomery multiplication utilizing unit 116. The remainder processing unit 303 calculates a quotient and a remainder of Montgomery multiplication based upon the inputted message $A_1$, message Z, and message $N_1$, and the input setting unit 321 stores the outputted quotient and remainder of Montgomery multiplication in a message $Q_1$ and a message $R_1$ (S1302).

The processing procedure from step S1303 to step S1307 is performed in the manner similar to the processing in step S1302.

The input setting unit 321 outputs the message $Q_1$, the message $N_0$, and the message Z to the Montgomery multiplication utilizing unit 116 and then stores the quotient and remainder of Montgomery multiplication outputted from the remainder processing unit 303 in a message $Q_2$ and a message $R_2$ (S1303).

The input setting unit 321 performs exchange of a message with the adder 325 to obtain a message $(2A_0+R_1+Q_2)$ having a value of $(2A_0+R_1+Q_2)$.

The input setting unit 321 outputs the message $A_1$, the message $(2A_0+R_1+Q_2)$, and the message $N_1$ to the Montgomery multiplication utilizing unit 116 and then stores a quotient and a remainder of Montgomery multiplication outputted from the remainder processing unit 303 in a message $Q_3$ and a message $R_3$ (S1304).

The input setting unit 321 outputs the message $Q_3$, the message $N_0$, and the message Z to the Montgomery multiplication utilizing unit 116 and then stores a quotient and a remainder of Montgomery multiplication outputted from the remainder processing unit 303 in a message $Q_4$ and a message $R_4$ (S1305).

The input setting unit 321 outputs the message $A_1$, the message $R_2$, and the message Z to the Montgomery multiplication utilizing unit 116 and then stores a quotient and a remainder of Montgomery multiplication outputted from the remainder processing unit 303 in a message $Q_5$ and a message $R_5$ (S1306).

The input setting unit 321 outputs the message $A_0$, the message $A_0$, and the message Z to the remainder processing unit 303 and then stores a quotient and a remainder in the format of Montgomery multiplication outputted from the remainder processing unit 303 in a message $Q_6$ and a message $R_6$ (S1307).

The input setting unit 321 outputs the message $R_3$, the message $R_4$, the message $R_5$, the message $R_6$, the message $Q_4$, the message $Q_5$, and the message $Q_6$ to the synthesizing unit 322. The synthesizing unit 322 calculates $Q_{total}$ and $R_{total}$ satisfying the following equations (S1308).

$$Q_{total}=R_3+Q_4+Q_5+Q_6$$

$$R_{total}=R_6+R_5+R_4$$

For example, the synthesizing unit 322 performs calculation in the following manner. The synthesizing unit 322 outputs the message $R_3$ and the message $Q_4$ to the adder 325. The adder 325 adds a value of the message $Q_4$ to the message $R_3$ and then outputs the obtained value as a message. The adder 325 receives the outputted message $(R_3+Q_4)$ as an input and then outputs the same together with the message $Q_5$ to the adder 325. The adder 325 adds a value of the message $Q_5$ to the message $(R_3+Q_4)$ and then outputs the obtained value as a message. The adder 325 receives the outputted message $(R_3+Q_4+Q_5)$ as an input and then outputs the same together with the message $Q_6$ to the adder 325. The adder 325 adds a value of the message $Q_6$ to the message $(R_3+Q_4+Q_5)$ and then outputs the obtained value as a message. The synthesizing unit 322 receives the outputted message $(R_3+Q_4+Q_5+Q_6)$ as an input and then stores the same in the message $Q_{total}$. Accordingly, the message $Q_{total}$, the message $R_3$, the message $Q_4$, the message $Q_5$, and the message $Q_6$ satisfy the following relational equation.

$$Q_{total}=R_3+Q_4+Q_5+Q_6$$

The synthesizing unit 322 outputs the message $R_6$ and the message $R_5$ to the adder 325. The adder 325 adds a value of the message $R_5$ to the message $R_6$ and then outputs the obtained value as a message. The adder 325 receives the outputted message $(R_6+R_5)$ as an input and then outputs the same together with the message $R_4$ to the adder 325. The adder 325 adds a value of the message $R_4$ to the message $(R_6+R_5)$ and then outputs the obtained value as a message. The synthesizing unit 322 receives the outputted message $(R_6+R_5+R_4)$ as an input and then stores the same in the message $R_{total}$.

Accordingly, the message $R_{total}$, the message $R_4$, the message $R_5$, and the message $R_6$ satisfy the following relational equation.

$$R_{total}=R_6+R_5+R_4$$

The synthesizing unit 322 outputs the message $Q_{total}$ and the message $R_{total}$ to the output unit 324. The output unit 324 outputs the inputted message $Q_{total}$ and message $R_{total}$ (S1309).

FIG. 19 is a flowchart showing a processing in the input/output processing unit 302 performed when Montgomery multiplication of a message A and a message B having a message N as modulus is calculated. A processing procedure where the input/output processing unit 302 outputs a message to the remainder processing unit 303 and calculates a remainder of 2n-bit Montgomery multiplication by using a quotient and a remainder of Montgomery multiplication outputted from the remainder processing unit 303 will be described.

First, a message $A_1$, a message $B_1$, a message $N_1$, a message $A_0$, a message $B_0$, a message $N_0$, and a message Z are inputted to the input setting unit 321 (S1351).

The input setting unit 321 outputs the message $B_1$, the message Z, and the message $N_1$ to the Montgomery multiplication utilizing unit 116. The remainder processing unit 303 calculates a quotient and a remainder of Montgomery multiplication based upon the inputted message $B_1$, message Z, and message $N_1$, and the input setting unit 321 stores the outputted quotient and remainder of Montgomery multiplication in the message $Q_1$ and the message $R_1$ (S1352).

A processing procedure from step S1353 to step S1358 is similar to that in step S1352.

The input setting unit 321 outputs the message $Q_1$, the message $N_0$, and the message Z to the Montgomery multiplication utilizing unit 116 and then stores a quotient and a remainder of Montgomery multiplication outputted from the remainder processing unit 303 in the message $Q_2$ and the message $R_2$ (S1353).

The input setting unit 321 performs exchange of a message with the adder 325 to obtain a message $(B_0+R_1+Q_2)$ having a value of $(B_0+R_1+Q_2)$.

The input setting unit 321 outputs the message $A_1$, the message $(B_0+R_1+Q_2)$, and the message $N_1$ to the Montgomery multiplication utilizing unit 116 and then stores a quotient and a remainder of Montgomery multiplication outputted from the remainder processing unit 303 in the message $Q_3$ and the message $R_3$ (S1354).

The input setting unit 321 outputs the message $A_0$, the message $B_1$, and the message $N_1$ to the Montgomery multiplication utilizing unit 116 and then stores a quotient and a remainder of Montgomery multiplication outputted from the remainder processing unit 303 in the message $Q_4$ and the message $R_4$ (S1355).

The input setting unit 321 performs exchange of a message with the adder 325 to obtain a message $(Q_3+Q_4)$ having a value of $(Q_3+Q_4)$.

The input setting unit 321 outputs the message $(Q_3+Q_4)$, the message $N_0$, and the message Z to the Montgomery multiplication utilizing unit 116 and then stores a quotient and a remainder of Montgomery multiplication outputted from the remainder processing unit 303 in the message $Q_5$ and the message $R_5$ (S1356).

The input setting unit 321 outputs the message $A_1$, the message $R_2$, and the message Z to the Montgomery multiplication utilizing unit 116 and then stores a quotient and a remainder of Montgomery multiplication outputted from the remainder processing unit 303 in the message $Q_6$ and the message $R_6$ (S1357).

The input setting unit 321 outputs the message $A_0$, the message $B_0$, and the message Z to the remainder processing unit 303 and then stores a quotient and a remainder of Montgomery multiplication outputted from the remainder processing unit 303 in the message $Q_7$ and the message $R_7$ (S1358).

The input setting unit 321 outputs the message $R_3$, the message $R_4$, the message $R_5$, the message $R_6$, the message $R_7$, the message $Q_5$, the message $Q_6$, and the message $Q_7$ to the synthesizing unit 322. The synthesizing unit 322 calculates $Q_{total}$ and $R_{total}$ satisfying the following equations (S1359).

$$Q_{total}=R_3+R_4+Q_5+Q_6+Q_7$$

$$R_{total}=R_7+R_6+R_5$$

For example, the synthesizing unit 322 performs calculation in the following manner. The synthesizing unit 322 outputs the message $R_3$ and the message $R_4$ to the adder 325. The adder 325 adds a value of the message $R_4$ to the message $R_3$ and then outputs the obtained value as a message. The synthesizing unit 322 receives the outputted message $(R_3+R_4)$ as an input and then outputs the same together with the message $Q_5$ to the adder 325. The adder 325 adds a value of the message $Q_5$ to the message $(R_3+R_4)$ and then outputs the obtained value as a message. The adder 325 receives the outputted message $(R_3+R_4+Q_5)$ as an input and then outputs the same together with the message $Q_6$ to the adder 325. The adder 325 adds a value of the message $Q_6$ to the message $(R_3+R_4+Q_5)$ and then outputs the obtained value as a message. The synthesizing unit 322 receives the outputted message $(R_3+R_4+Q_5+Q_6)$ as an input and then outputs the same together with the message $Q_7$ to the adder 325. The adder 325 adds a value of the message $Q_7$ to the message $(R_3+R_4+Q_5+Q_6)$ and then outputs the obtained value as a message. The synthesizing unit 322 receives the outputted message $(R_3+R_4+Q_5+Q_6+Q_7)$ as an input and then stores the same in the message $Q_{total}$. Accordingly, the message $Q_{total}$, the message $R_3$, the message $R_4$, the message $Q_5$, the message $Q_6$, and the message $Q_7$ satisfy the following relational equation.

$$Q_{total}=R_3+R_4+Q_5+Q_6+Q_7$$

The synthesizing unit 322 outputs the message $R_7$ and the message $R_6$ to the adder 325. The adder 325 adds a value of the message $R_6$ to the message $R_7$ and then outputs the obtained value as a message. The synthesizing unit 322 receives the outputted message $(R_7+R_6)$ as an input and then outputs the same together with the message $R_5$ to the adder 325. The adder 325 adds a value of the message $R_5$ to the message $(R_7+R_6)$ and then outputs the obtained value as a message. The synthesizing unit 322 receives the outputted message $(R_7+R_6+R_5)$ as an input and then stores the same in the message $R_{total}$. Accordingly, the message $R_{total}$, the message $R_5$, the message $R_6$, and the message $R_7$ satisfy the following relational equation.

$$R_{total}=R_7+R_6+R_5$$

The synthesizing unit 322 outputs the message $Q_{total}$ and the message $R_{total}$ to the output unit 324. The output unit 324 outputs the received message $Q_{total}$ and message $R_{total}$ (S1360).

<Processing in Remainder Processing Unit>

Figure 20:
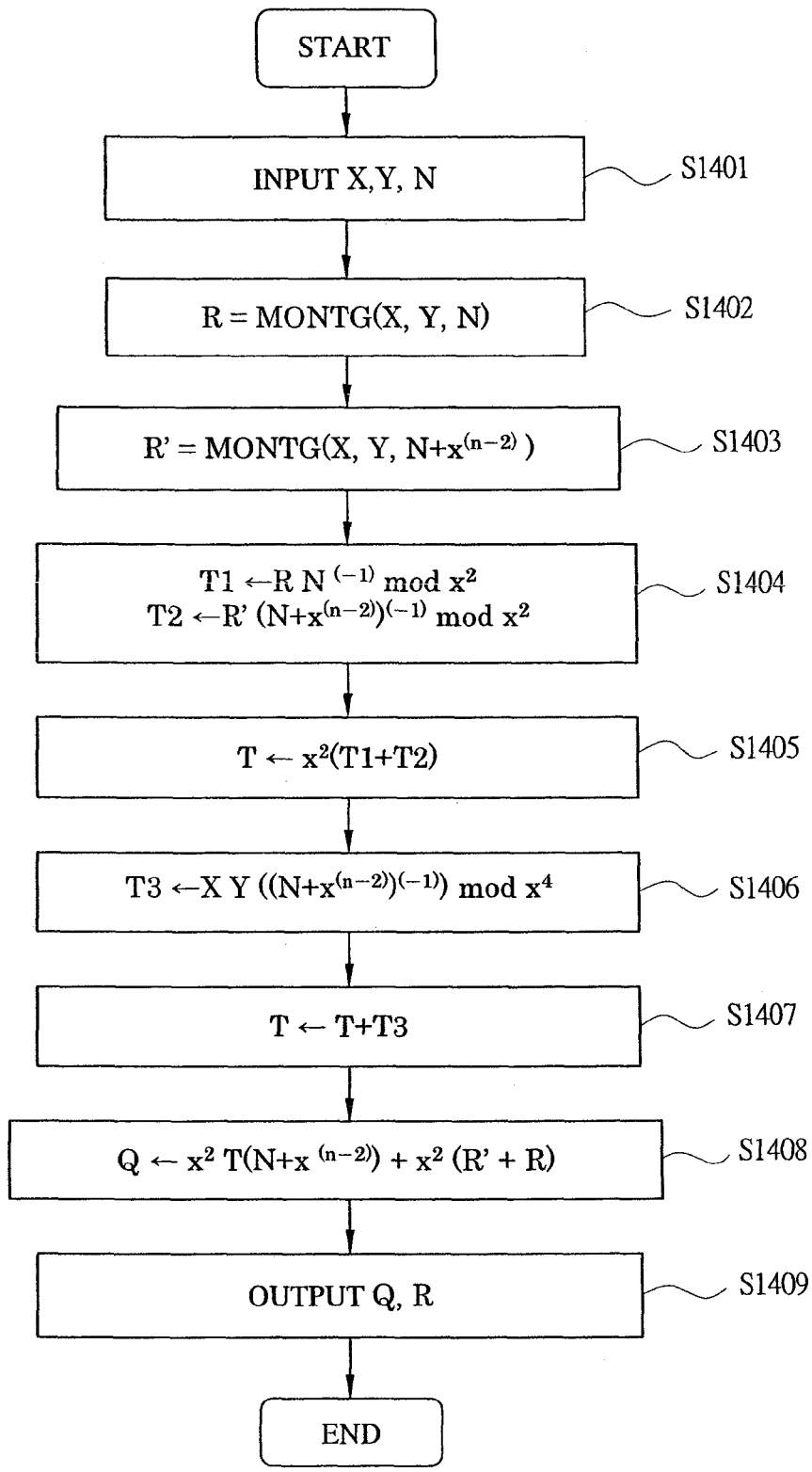
FIG. 20 exemplifies a processing flow in the remainder processing unit in the computer to which the second embodiment of the present invention has been applied.

A processing in the remainder processing unit in the computer in the communication system to which the modular multiplication processing apparatus according to the second embodiment of the present invention has been applied will be described with reference to FIG. 20. FIG. 20 is a flowchart showing a processing in the remainder processing unit in the computer in the communication system to which the modular multiplication processing apparatus according to the second embodiment of the present invention has been applied.

FIG. 20 exemplifies a processing procedure where the remainder processing unit 303 obtains a quotient and a remainder of Montgomery multiplication when the maximum number of dimensions of a message that can be inputted to the coprocessor 115 is (n−1). In FIG. 20, the coprocessor 115 is represented as a function MONTG that receives three messages as an input and outputs one message.

First, a message X, a message Y, and a message N whose maximum numbers of dimensions are (n−1) are inputted to the remainder processing unit 303 (S1401).

The coprocessor handling unit 331 sets the message X, the message Y, and the message N in the coprocessor 115 to btain a message R having a value of $XYM^{(-1)}$mod N through Montgomery multiplication performed by the coprocessor (S1402).

Next, the coprocessor handling unit 331 changes the second bit from the most significant bit ((n−2)-th bit from the least significant bit) of a message N in the coprocessor 115 to perform a processing similar to that in step S1402. For example, the coprocessor handling unit 331 reverses the second bit from the most significant bit of the message N to calculate a message R' having a value of $XYM^{(-1)}$mod (N+$x^{(n-2)}$) using the coprocessor 115. However, after the calculation of the remainder, a value of the message N set in the coprocessor 115 is restored to its original value (S1403). The coprocessor handling unit 331 outputs the message X, the message Y, the message N, the message R, and the message R' to the quotient operating unit 332, and the quotient operating unit 332 receives these messages.

The quotient operating unit 332 performs exchange of the message X, the message Y, and the message N with the adder 335, the mod-operating unit 338, and the multiplication unit 339 and then stores a result of $RN^{(-1)}$mod $x^2$ in a message T1 and a result of $R'(N+x^{(n-2)})^{(-1)}$mod $x^2$ in a message T2 (S1404).

The quotient operating unit 332 performs exchange of messages with the adder 335 and the multiplication unit 339 to obtain T satisfying the following equation.

$$T = x^2(T1+T2)$$

For example, the message T is calculated in the following manner. The quotient operating unit 332 outputs the message T1 and the message T2 to the adder 335. The adder 335 outputs a value obtained by adding the message T2 to the message T1. The quotient operating unit 332 stores the value outputted from the adder in the message T and outputs the message T and the constant $x^2$ to the multiplication unit 339. The multiplication unit 339 outputs the product of a value of the message T and a value of the constant $x^2$ as a message. The quotient operating unit 332 stores a value of the outputted message in the message T (S1405).

The quotient operating unit 332 outputs the message X, the message Y, and the message N to the adder 335 and the mod-operating unit 338 to store a value satisfying the following equation in the message T3 (S1406).

$$T3 = XY((N+x^{(n-2)})^{(-1)}\bmod)x^4$$

The quotient operating unit 332 outputs the message T and the message T3 to the adder 335 to store a value of (T+T3) in the message T (S1407).

The quotient operating unit 332 outputs the message T, the message N, the message R, and the message R' to the adder 335 to store a value of $x^2T(N+x^{(n-2)})+x^2(R'+R)$ in the message Q (S1408).

The remainder operating unit 333 outputs the message R to the output unit 334. The quotient operating unit 332 outputs the message Q to the output unit 334. The output unit 334 outputs the message Q and the message R to the input/output processing unit 302 (S1409).

In step S1401 to step S1409, the processing procedure where the remainder processing unit 303 obtains a quotient and a remainder of Montgomery multiplication when the maximum number of dimensions of a message that can be inputted into the coprocessor 115 is (n−1) is shown with reference to a flowchart in FIG. 20. Even if the maximum number of dimensions of a message that can be inputted into the coprocessor 115 is not (n−1), a quotient and a remainder of Montgomery multiplication can be obtained through a similar processing.

<Applications>

In this embodiment, the apparatus where a bit length of modular multiplication based upon Montgomery multiplication using binary field is multiplied by k (0<k≦2) times has been described. The technique can be applied to all processings that require modular multiplication based upon binary field such as encryption processing and decryption processing of AES (advanced encryption standard) cryptosystem.

Similar to the first embodiment, modular multiplication where a bit length of a coprocessor has been multiplied by k(>2) times can be realized by utilizing the technique according to this embodiment recursively.

Similar to the first embodiment, this embodiment can be applied to not only a coprocessor implemented as hardware but also a coprocessor implemented as software.

(Third Embodiment)

Fast modular multiplication to which the Montgomery multiplication is applied (hereinafter, called "bipartite modular multiplication") has been proposed in Document4. A remainder $R_\alpha$ to be obtained by the modular multiplication satisfies the following equation.

$$R_\alpha = XY(\alpha M)^{(-1)} \bmod N \qquad \text{Equation 4}$$

Here, X and Y are messages with 2n bits or less, M is Montgomery constant, and α is a decimal satisfying the condition that αn is an integer and the conditional expression (0<α<1). For example, a value of α can be set to 0.5.

The bipartite modular multiplication can be regarded as Montgomery multiplication where a value of Montgomery constant has been changed. Accordingly, modular multiplication can be performed similarly to the first embodiment and the second embodiment also when the bipartite modular multiplication has been implemented in a coprocessor. In the third embodiment, the third calculating method of modular multiplication based upon the bipartite modular multiplication will be described.

<Function Blocks in Montgomery Multiplication Utilizing Unit>

A processing in the Montgomery multiplication utilizing unit 116 in the computer A101 will be described in detail with reference to FIG. 3.

Similar to the first embodiment, the Montgomery multiplication utilizing unit 116 has a function to obtain a quotient and a remainder of Montgomery multiplication and a remainder of a 2n bits message with using the coprocessor 115. In this embodiment, a multiplication unit 318 and a division unit 319 are added to the expression processing unit 301 that is a function block in the Montgomery multiplication utilizing unit 116 shown in FIG. 3 and a division unit 340 is added to the remainder processing unit 303.

The multiplication unit 318 receives two massages as inputs to produce a message with a value of the product of the two messages and then outputs the produced massage to a function unit that is an output source of the messages.

The division unit 319 and the division unit 340 receive two messages as inputs to divide a value of the first message by a value of the second message and produce a message having a value of a remainder thereof and then output the produced message to a function unit that is an output source of the messages.

Accordingly, the first processing unit is composed of the coprocessor handling unit 331, the quotient operating unit 332, the remainder operating unit 333, the adder 335, the subtractor 336, the condition-determining unit 337, the mod-operating unit 338, the multiplication unit 339, and the division unit 340 in the remainder processing unit 303.

Also, the second processing unit is composed of the input setting unit 321, the synthesizing unit 322, the adder 325, the subtractor 326 in the input/output processing unit 302, the fifth processing unit is composed of the repetition-determining unit 327, the condition-determining unit 328 in the input/output processing unit 302, and the sixth processing unit is composed of the correcting unit 323, the adder 325, and the subtractor 326 in the input/output processing unit 302.

Further, the third processing unit is composed of the expression transforming unit 311, the adder 315, the subtractor 316, the multiplication unit 318, and the division unit 319 in the expression processing unit 301, and the fourth processing unit is composed of the reverse-transforming unit 312, the adder 315, the subtractor 316, the synthesizing unit 317, the multiplication unit 318, and the division unit 319 in the expression processing unit 301.

<Processing in Expression Processing Unit>

Figure 21:
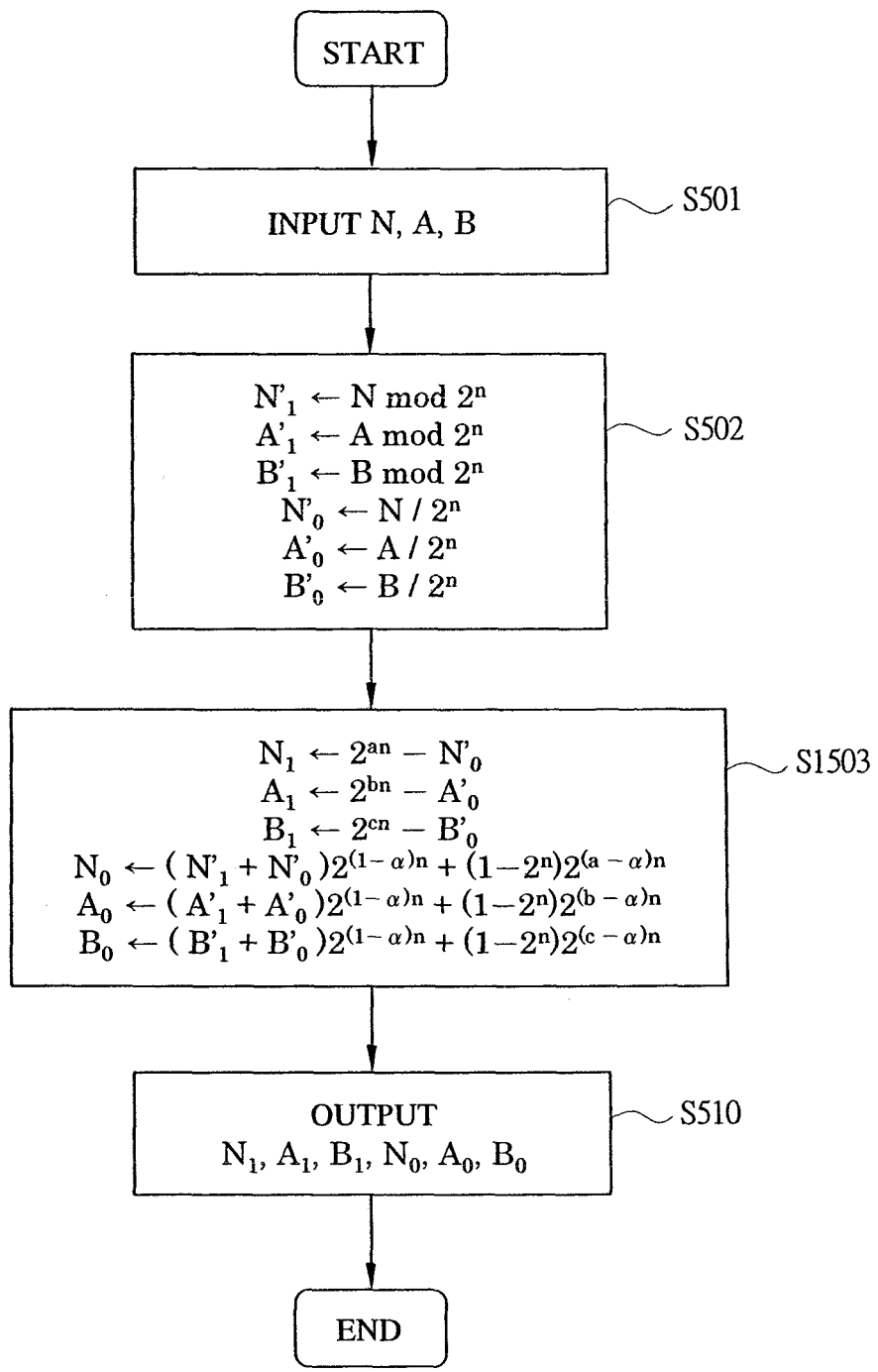
FIG. 21 exemplifies a transforming processing flow of integer expression performed by an expression processing unit in the computer to which a third embodiment of the present invention has been applied.
Figure 22:
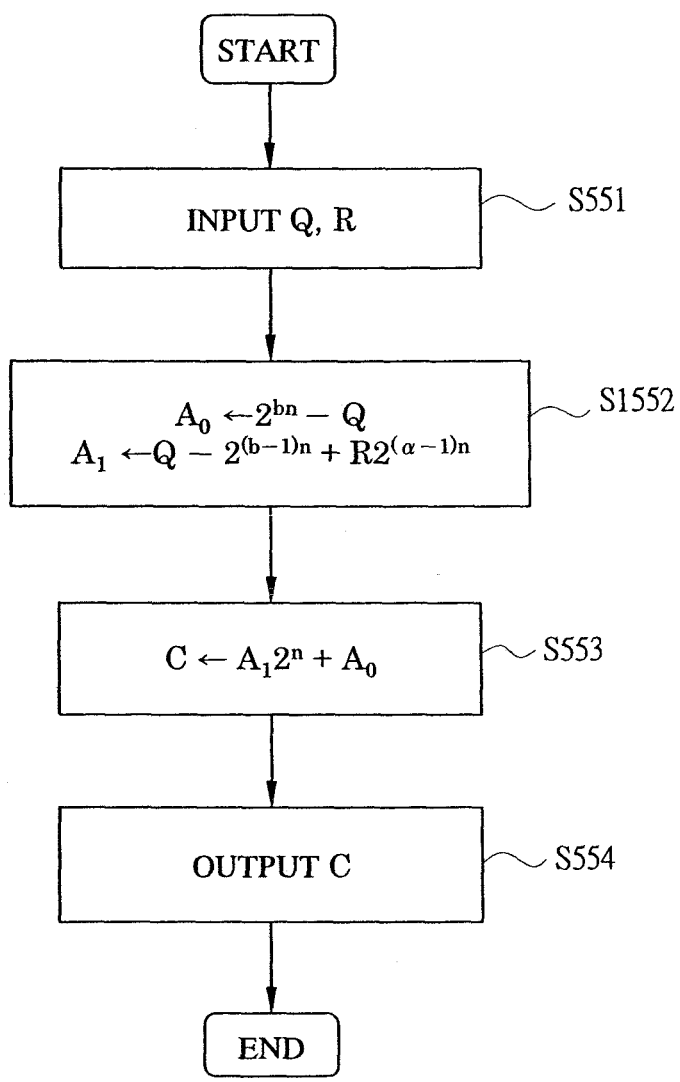
FIG. 22 exemplifies a transforming processing flow of integer expression performed by an expression processing unit in the computer to which the third embodiment of the present invention has been applied.

Next, a transforming processing of integer expression performed by the expression processing unit in the computer in the communication system to which the modular multiplication processing apparatus according to the third embodiment of the present invention has been applied will be described with reference to FIG. 21 and FIG. 22. FIG. 21 and FIG. 22 are flowcharts showing a transforming processing of integer expression performed by the expression processing unit in the computer in the communication system to which the modular multiplication processing apparatus according to the third embodiment of the present invention has been applied.

The expression processing unit 301 has a function to transform a message to a message for bipartite modular multiplication or inversely transform the latter to its original message to output the same.

For example, when a 2n-bit message N is to be transformed, a message $N_1$ and $N_0$ for bipartite modular multiplication with n bit satisfy the following equation with the message N.

$$N = N_1 Z + N_0 M_\alpha \quad \text{Equation 5}$$

Here, constant for bipartite modular multiplication $M_\alpha$ is a product of a constant $\alpha$ and Montgomery constant M, which satisfies equation $M_\alpha = \alpha M$. Z is $2^n - k$ (k is a positive odd number). Similar to the first embodiment, $N_1$ is coprime to $M_\alpha$ by setting Z to an odd number.

In the following, a case of k=1 (namely, $Z = 2^n - 1$) will be described. Even if k takes another value, the procedure can be implemented similarly to the first embodiment.

FIG. 21 exemplifies a processing procedure performed until the expression transforming unit 311 outputs a message for bipartite modular multiplication. Since the processings in step S501, step S502, and step S510 are similar to those in flowchart shown in FIG. 5 used in the first embodiment, description thereof is omitted. A processing in step S1503 shown in FIG. 21 where a different processing is performed will be described.

In step S1503, the expression transforming unit 311 produces a message $N_1$, a message $N_0$, a message $A_1$, a message $A_0$, a message $B_1$, and a message $B_0$ so as to satisfy Equation 5. For example, when the message $N_1$, the message $N_0$, the message $A_1$, the message $A_0$, the message $B_1$, and the message $B_0$ are produced so as to satisfy the following equations, Equation 5 can be satisfied.

$$N_1 = 2^{an} - N'_0$$

$$A_1 = 2^{bn} - A'_0$$

$$B_1 = 2^{cn} - B'_0$$

$$N_0 = (N'_1 + N'_0) 2^{(1-\alpha)n} + (1 - 2^n) 2^{(a-\alpha)n}$$

$$A_0 = (A'_1 + A'_0) 2^{(1-\alpha)n} + (1 - 2^n) 2^{(b-\alpha)n}$$

$$B_0 = (B'_1 + B'_0) 2^{(1-\alpha)n} + (1 - 2^n) 2^{(c-\alpha)n}$$

Here, values of a, b, and c are equal to or larger than $\alpha$. For example, $a = \alpha$, $b = 1$, and $c = \alpha$ can be set.

The expression transforming unit 311 can perform calculation in the following manner. The expression transforming unit 311 performs exchange of messages with the adder 315, the subtractor 316, and the multiplication unit 318, thereby storing a value of $2^{an} - N'_0$ in the message $N_0'$. The expression transforming unit 311 performs exchange of messages with the adder 315, the subtractor 316, the multiplication unit 318, and the division unit 319, thereby storing a value of $(N'_1 + N'_0) 2^{(1-\alpha)n} + (1 - 2^n) 2^{(a-\alpha)n}$ in the message $N_0$. The message $A_1$, the message $A_0$, the message $B_1$, and the message $B_0$ are also produced in the same manner as those of the message $N_1$ and the message $N_0$ (S1503).

Incidentally, the specific calculation method has been shown in step S1503, but any method that can calculate the message satisfying Equation 5 can be adopted.

Next, a processing procedure performed until the inverse-transforming unit 312 transforms a message for bipartite modular multiplication to a bit string (ordinary expression form in a computer) expressed by binary number based upon a bit string of the message and then outputs the same will be described with reference to a flowchart shown in FIG. 22.

FIG. 22 exemplifies a processing procedure performed until the inverse-transforming unit 312 outputs a message for bipartite modular multiplication. Since processings in step S551, step S553, and step S554 are similar to the processings shown by the flowchart in FIG. 6 used in the first embodiment, description thereof is omitted. Step S1552 shown in FIG. 22 where a different processing is performed will be described.

In step S1552, the inverse-transforming unit 312 produces a message $A_0$ and a message $A_1$ so as to satisfy the following equation (S1552).

$$A_1 2^n + A_0 = QZ + RM_\alpha \quad \text{Equation 6}$$

For example, when the message $A_0$ and the message $A_1$ are produced so as to satisfy the following equations, Equation 6 can be satisfied.

$$A_0 = 2^{bn} - Q$$

$$A_1 = Q - 2^{(b-1)n} + R2^{(\alpha-1)n}$$

The inverse-transforming unit 312 performs exchange of messages with the adder 315, the subtractor 316, the multiplication unit 318, and the division unit 319, thereby obtaining the message $A_0$ having a value of $2^{bn} - Q$ and the message $A_1$ having a value of $Q - 2^{(b-1)n} + R2^{(\alpha-1)n}$.

<Processing in Input/Output Processing Unit>

A processing in the input/output processing unit 302 is similar to that in the first embodiment.

<Processing in Remainder Processing Unit>

Figure 23:
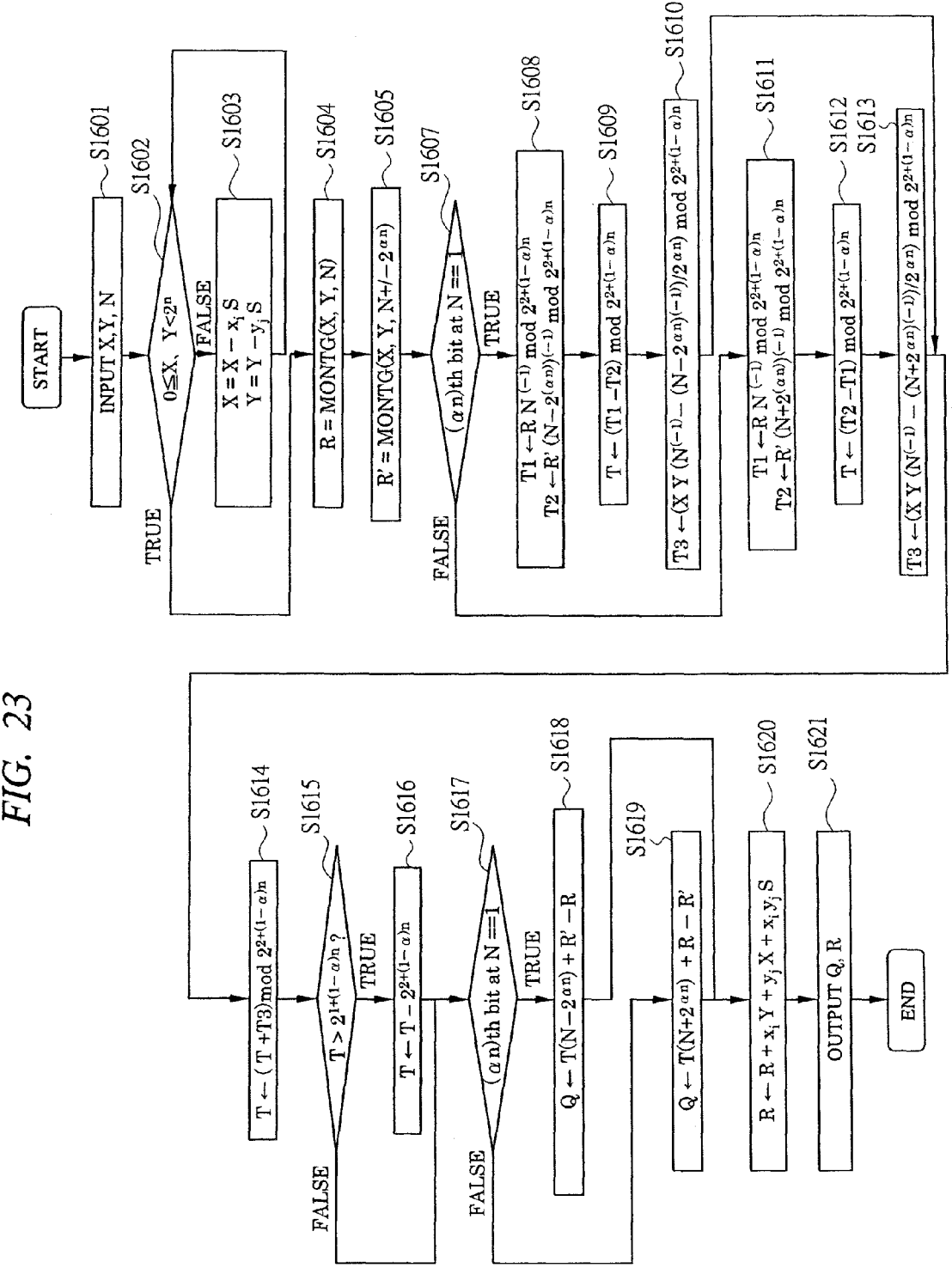
FIG. 23 exemplifies a processing flow in the remainder processing unit in the computer to which the third embodiment of the present invention has been applied.

Next, a processing in a remainder processing unit in the computer in the communication system to which the modular multiplication processing apparatus according to the third embodiment of the present invention has been applied will be described with reference to FIG. 23. FIG. 23 is a flowchart showing a processing in a remainder processing unit in the computer in the communication system to which the modular multiplication processing apparatus according to the third embodiment of the present invention has been applied.

The remainder processing unit 303 has a function to obtain a quotient and a remainder of bipartite modular multiplication by using an inputted message.

The remainder processing unit 303 has a function to obtain a quotient and a remainder of bipartite modular multiplication by using an inputted message and a remainder inputted from the coprocessor 115. Here, a quotient and a remainder of bipartite modular multiplication indicate Q and R satisfying the following equation.

$$XY = QN + RM_\alpha \qquad \text{Equation 7}$$

Equation 7 can be obtained by transforming Equation 4. In Equation 7, the constant $M_\alpha$ for bipartite modular multiplication on the left-hand side of Equation 4 is a multiplier of a remainder R and multiplicand to modulus N is a quotient Q. An equation defined for bipartite modular multiplication using a quotient is Equation 7.

A processing procedure performed when the maximum bit number of a message that can be processed by the coprocessor 115 is n will be described with reference to a flowchart in FIG. 23. Input and output of a message to and from the coprocessor 115 are expressed using a function MONTG.

Respective processings in step S1601, step S1602, and step S1603 are similar to the processings in step S801, step S802, and step S803 shown in FIG. 11 of the first embodiment.

The coprocessor handling unit 331 sets a message X, a message Y, and a message N in the coprocessor 115 to obtain a message R having a value of $XYM_\alpha^{(-1)} \bmod N$ through bipartite modular multiplication performed by the coprocessor 115 (S1604).

Next, the coprocessor handling unit 331 changes a value of a massage N which is modulus from N to $(N+2^{\alpha n})$ or $(N-2^{\alpha n})$ to perform a processing similar to the processing in step S702. For example, the coprocessor handling unit 331 reverses the $\alpha n$-th bit (which is the $\alpha n$-th bit from the least significant bit, when the least significant bit is the $0^{th}$ bit) of a message N in the coprocessor 115 and calculates a message R' similarly using the coprocessor 115. Then, a value of the message N set in the coprocessor 115 is restored to its original value (S1605).

The condition-determining unit 337 determines whether or not the $\alpha n$-th bit of the message N is 1. When the condition is satisfied, the processing proceeds to step S1608, and when the condition is not satisfied, the processing proceeds to step S1610 (S1607).

The quotient operating unit 332 performs exchange of the message N, the message R, the message R', the constant $2^{\alpha n}$, and the constant $2^{2+(1-\alpha)n}$ with the subtractor 336, the mod-operating unit 338, and the multiplication unit 339 and then stores a result of $RN^{(-1)} \bmod 2^{2+(1-\alpha)n}$ in a message T1 and a result of $R'(N-2^{(\alpha n)})^{(-1)} \bmod 2^{2+(1-\alpha)n}$ in a message T2 (S1608).

The quotient operating unit 332 performs exchange of the message T2, the message T1, and the constant $2^{2+(1-\alpha)n}$ with the mod-operating unit 338 and the subtractor 336 to store a result of $(T1-T2) \bmod 2^{2+(1-\alpha)n}$ in the message T (S1609).

The quotient operating unit 332 performs exchange of the message X, the message Y, the message N, the constant $2^{\alpha n}$, and the constant $2^{2+(1-\alpha)n}$ with the mod-operating unit 338, the subtractor 336, the multiplication unit 339, and the division unit 340 and then stores a result of $XY((N^{(-1)}-(N-2^{\alpha n})^{(-1)})/2^{\alpha n}) \bmod 2^{2+(1-\alpha)n}$ in a message T3 (S1610).

In step S1611, the quotient operating unit 332 performs exchange of the message N, the message R, the message R', the constant $2^{\alpha n}$, and the constant $2^{2+(1-\alpha)n}$ with the adder 335, the mod-operating unit 338, and the multiplication unit 339 and then stores a result of $RN^{(-1)} \bmod 2^{2+(1-\alpha)n}$ in a message T1 and a result of $R'(N+2^{(\alpha n)})^{(-1)} \bmod 2^{2+(1-\alpha)n}$ in a message T2 (S1611).

The quotient operating unit 332 performs exchange of the message T1, the message T2, and the constant $2^{(1-\alpha)n}$ with the subtractor 336 and the mod-operating unit 338 and then stores a result of $(T2-T1) \bmod 2^{(1-\alpha)n}$ in the message T (S1612).

The quotient operating unit 332 performs exchange of the message X, the message Y, the message N, the constant $2^{\alpha n}$, and the constant $2^{2+(1-\alpha)n}$ with the adder 335, the subtractor 336, the mod-operating unit 338, the multiplication unit 339, and the division unit 340 and then stores a result of $XY((N^{(-1)}-(N+2^{\alpha n})^{(-1)})/2^{\alpha n}) \bmod 2^{2+(1-\alpha)n}$ in a message T3 (S1613).

The quotient operating unit 332 performs exchange of the message T, the message T3, and the constant $2^{2+(1-\alpha)n}$ with the adder 325 and the mod-operating unit 338 and then stores a result of $(T+T3) \bmod 2^{2+(1-\alpha)n}$ in the message T (S1614).

The quotient operating unit 332 determines whether or not the conditional expression $(T > 2^{1+(1-\alpha)n})$ is satisfied (S1615). When the condition is satisfied, the processing proceeds to step S1616, and when the condition is not satisfied, the processing proceeds to step S1617. In step S1616, the quotient operating unit 332 outputs the message T and the constant $2^{2+(1-\alpha)n}$ to the subtractor 336 and then stores a value of $T-2^{2+(1-\alpha)n}$ in the message T (S1616).

The quotient operating unit 332 outputs the message N to the condition-determining unit. The condition-determining unit 337 determines whether or not the $\alpha n$-th bit of the message N is 1. When the condition is satisfied, the processing proceeds to step S1618, and when the condition is not satisfied, the processing proceeds to step S1619 (S1617).

The quotient operating unit 332 performs exchange of messages with the adder 335, the subtractor 336, and the multiplication unit 339 and then stores a result of $T(N-2^{\alpha n})+R'-R$ in a message Q (S1618).

The quotient operating unit 332 performs exchange of messages with the adder 335, the subtractor 336, and the multiplication unit 339 and then stores a result of $T(N+2^{\alpha n})+R-R'$ in the message Q (S1619).

The quotient operating unit 332 outputs a message R, a message X, a message Y, an integer $x_i$, an integer $y_j$, and a message S to the remainder operating unit 333. The remainder operating unit 333 performs exchange of the message R, the message S, the message X, the message Y, the integer $x_i$, and the integer $y_j$ with the adder 335, the subtractor 336, and the multiplication unit 339 and then stores a result of $R + x_i Y + y_j X + x_i y_j S$ in the message R (S1620).

The remainder operating unit 333 outputs the message R to the output unit 334. The quotient operating unit 332 outputs the message Q to the output unit 334. The output unit 334 outputs the received message Q and message R to the input/output processing unit 302 as a quotient Q and a remainder R of Montgomery multiplication (S1621).

<Ingenuity on Implementation>

Even in this embodiment, such a problem may arise that an absolute value of a quotient of bipartite modular multiplication becomes large excessively. However, it is possible to perform the transformation so that the absolute value of the quotient of bipartite modular multiplication becomes small similarly to the processing procedure shown in FIG. 14 of the first embodiment. In such a case, the Montgomery constant M handled in step S1004, step S1005, step S1014, step S1015, step S1017, and step S1018 shown in FIG. 14 of the first embodiment may be transformed to the constant $M_\alpha$.

‹Applications›

The technique described in this embodiment can be applied to all processings that requires modular multiplication such as RSA cryptosystem, ElGamal cryptosystem, DSA (digital signature algorithm) cryptosystem, elliptic curve cryptosystem, and pseudo-random number generation.

In this embodiment, the fact that modular multiplication for k ($0<k\leq 2$) times the bit length of the coprocessor using bipartite modular multiplication can be executed has been shown. Furthermore, similar to the first embodiment, the bit length multiplied by k ($>2$) times can be handled by utilizing the technique described in this embodiment recursively.

In this embodiment, the fact that modular multiplication can be processed with a coprocessor implemented as hardware has been shown, but the technique can be applied to the case where the coprocessor is implemented as software.

Similar to the second embodiment, the technique described in the third embodiment can be utilized to a coprocessor using bipartite modular multiplication based upon binary field. That is, the technique can be applied to modular multiplication based upon binary field such as AES (advanced encryption standard) cryptosystem. Further, when the technique described in the third embodiment is applied to a coprocessor using bipartite modular multiplication based upon binary field, similar to the second embodiment, the bit length multiplied by k ($>2$) times can be handled by utilizing the technique described in this embodiment recursively.

The bipartite modular multiplication is modular multiplication obtained by combining ordinary modular multiplication and Montgomery multiplication. The technique described in the third embodiment can be applied even to the case where a plurality of coprocessors based upon ordinary modular multiplication and Montgomery multiplication are implemented as hardware or as software.

Further, the technique described in the third embodiment can be applied even to the case where a plurality of coprocessors having different values of $\alpha$ based upon bipartite modular multiplication are implemented as hardware or as software.

Further, the embodiments described above relate to a modular multiplication processing apparatus used in the field of security, and they can be applied for implementation to a cipher device mounted on a server, a smart card, or the like.

The specification and drawings are, accordingly, to be regarded in an illustrative rather than a restrictive sense. It will, however, be evident that various modifications and changes may be made thereto without departing from the spirit and scope of the invention as set forth in the claims.

What we claim is:

1. A modular multiplication processing apparatus comprising:
    a coprocessor that performs modular multiplication in accordance with Montgomery multiplication; and
    a first processing unit that computes a quotient and a remainder of Montgomery multiplication using said coprocessor,
    wherein said coprocessor calculates a quotient of the Montgomery multiplication and outputs a calculated result of the Montgomery multiplication, and wherein said first processing unit outputs a quotient and a remainder of the Montgomery multiplication by using the calculated result from said coprocessor and a Montgomery constant defined by a calculation equation of the Montgomery multiplication so that wherein said modular multiplication processing apparatus is capable of computing modular multiplication of data having a predetermined bit length which would otherwise be more difficult for said coprocessor to calculate.

2. The modular multiplication processing apparatus according to claim 1,
    wherein the quotient and the remainder of the Montgomery multiplication computed in said first processing unit correspond to data Q and data R, respectively, which satisfy an equation of $XY=QN+RM$ using data X, data Y, data N, and Montgomery constant M used in the Montgomery multiplication.

3. The modular multiplication processing apparatus according to claim 2,
    wherein processing in said first processing unit is comprised of processing to change the data X and the data Y to be equal to or less than a maximum bit length of said coprocessor and to compute the quotient Q and the remainder R of the Montgomery multiplication from a remainder of modular multiplication of the data X and the data Y by using said coprocessor.

4. The modular multiplication processing apparatus according to claim 1, further comprising:
    a second processing unit that supplies data to be computed to said first processing unit and computes modular multiplication by the Montgomery multiplication regarding data having said predetermined bit length, and,
    wherein said second processing unit computes the modular multiplication by using the quotient and the remainder of the Montgomery multiplication computed by said first processing unit.

5. The modular multiplication processing apparatus according to claim 4, further comprising:
    a fifth processing unit that instructs repetition of modular exponentiation of data having a bit length which is hard for said coprocessor to calculate in order for said second processing unit to compute modular exponentiation of data having a bit length which is hard for said coprocessor to calculate.

6. The modular multiplication processing apparatus according to claim 5, further comprising:
    a sixth processing unit that transforms the quotient and the remainder of the Montgomery multiplication so that the quotient and the remainder of the Montgomery multiplication fall within a fixed bit length.

7. The modular multiplication processing apparatus according to claim 4, further comprising:
    a third processing unit that transforms a format of data inputted into said modular multiplication processing apparatus to a format suitable for the Montgomery multiplication.

8. The modular multiplication processing apparatus according to claim 7, further comprising:
    a fourth processing unit that inversely transforms a remainder of modular multiplication obtained by said second processing unit from the format suitable for the Montgomery multiplication to the format of the inputted data.

9. The modular multiplication processing apparatus according to claim 7,
    wherein processing in said third processing unit is comprised of processing to calculate data $A_1$ and data $A_0$ which satisfy an equation of $A=A_1Z+A_0M$ using Montgomery constant M and an integer Z for the Montgomery multiplication regarding data A inputted to said modular multiplication processing apparatus.

10. The modular multiplication processing apparatus according to claim 9, further comprising:
    a fourth processing unit that inversely transforms a remainder of modular multiplication obtained by said second processing unit from the format suitable for the Montgomery multiplication to the format of the inputted data, wherein processing in said fourth processing unit is comprised of processing to calculate data $A_1'$ and data $A_0'$ which satisfy an equation of $A_1'2^n+A_0'=A_1Z+A_0M$ using the data $A_1$ and the data $A_0$ which have been transformed to the format suitable for the Montgomery multiplication and the Montgomery constant M and the integer Z used in the Montgomery multiplication.

* * * * *